United States Patent
de Antoni

(10) Patent No.: US 9,778,066 B2
(45) Date of Patent: Oct. 3, 2017

(54) USER QUERY AND GAUGE-READING RELATIONSHIPS

(71) Applicants: Allied Telesis Holdings Kabushiki Kaisha, Tokyo (JP); ALLIED TELESIS, INC., Bothell, WA (US)

(72) Inventor: Ferdinand E. K. de Antoni, Manila (PH)

(73) Assignee: ALLIED TELESIS HOLDINGS KABUSHIKI KAISHA, Tokyo (JP)

(*) Notice: Subject to any disclaimer, the term of this patent is extended or adjusted under 35 U.S.C. 154(b) by 627 days.

(21) Appl. No.: 14/284,009

(22) Filed: May 21, 2014

(65) Prior Publication Data

US 2014/0350893 A1    Nov. 27, 2014

Related U.S. Application Data

(63) Continuation-in-part of application No. 14/281,896, filed on May 20, 2014, now abandoned, and a
(Continued)

(30) Foreign Application Priority Data

May 23, 2013  (PH) .............................. 1-2013-00136

(51) Int. Cl.
*G01D 21/00*    (2006.01)
*G01D 1/16*     (2006.01)
(Continued)

(52) U.S. Cl.
CPC .............. *G01D 1/16* (2013.01); *G01D 21/02* (2013.01); *G06Q 10/08* (2013.01)

(58) Field of Classification Search
CPC .......... G01D 1/16; G01D 21/02; G06Q 10/00; G06Q 10/08
(Continued)

(56) References Cited

U.S. PATENT DOCUMENTS 4,970,391 A    11/1990  Uber
6,047,244 A     4/2000  Rud
(Continued)

FOREIGN PATENT DOCUMENTS

JP    2007085755 A    4/2007
KR    1020070028813 A    3/2007
(Continued)

OTHER PUBLICATIONS

International Search Report for serial No. PCT/US2015/031632 mailed Aug. 27, 2015.
(Continued)

*Primary Examiner* — John H Le
(74) *Attorney, Agent, or Firm* — Brooks Acordia IP Law, P.C.; Michael Zarrabian

(57) ABSTRACT

Domain agnostic systems and methods for the capture, storage, and analysis of sensor readings including: collecting gauge readings from a plurality of gauges; storing the gauge readings in a database; normalizing select gauge readings in near-real time at the server from the database of the server in response to a user query; and generating a relationship among the select gauge readings in response to the user query; generating information for configuring an entity that provides feedback in a domain agnostic system, based on said relationship among the select gauge readings; and generating an alert in response to the select gauge readings satisfying a certain condition.

13 Claims, 26 Drawing Sheets

Related U.S. Application Data continuation-in-part of application No. 14/281,901, filed on May 20, 2014, and a continuation-in-part of application No. 14/281,904, filed on May 20, 2014, now abandoned.

(51) Int. Cl.
   *G01D 21/02* (2006.01)
   *G06Q 10/08* (2012.01)

(58) Field of Classification Search
   USPC .......... 702/93, 122, 123, 182, 188, 189; 340/506, 531, 539.26; 455/556.1; 701/532; 707/769
   See application file for complete search history.

(56) References Cited

U.S. PATENT DOCUMENTS

| | | |
|---|---|---|
| 6,642,843 B2 | 11/2003 | Satoh |
| 6,686,838 B1 | 2/2004 | Rezvani et al. |
| 6,833,814 B2 | 12/2004 | Gilboa et al. |
| 7,030,752 B2 | 4/2006 | Tyroler |
| 7,091,854 B1 | 8/2006 | Miao |
| 7,555,412 B2 | 6/2009 | Nath et al. |
| 8,575,560 B1 | 11/2013 | Fechner |
| 8,732,592 B2 | 5/2014 | Nielsen et al. |
| 2003/0058095 A1 | 3/2003 | Satoh |
| 2003/0107650 A1 | 6/2003 | Colmenarez et al. |
| 2004/0164859 A1 | 8/2004 | La Spisa |
| 2005/0248454 A1* | 11/2005 | Hanson ............ G06Q 10/087 340/539.26 |
| 2006/0047419 A1* | 3/2006 | Diendorf ............ G01C 21/26 701/532 |
| 2006/0086913 A1 | 4/2006 | Spahn |
| 2006/0097171 A1 | 5/2006 | Balchunas et al. |
| 2007/0044539 A1 | 3/2007 | Sabol et al. |
| 2007/0143079 A1 | 6/2007 | Duxbury et al. |
| 2007/0195712 A1 | 8/2007 | Thayer et al. |
| 2007/0222585 A1 | 9/2007 | Sabol et al. |
| 2007/0265866 A1 | 11/2007 | Fehling et al. |
| 2008/0036585 A1 | 2/2008 | Gould |
| 2008/0191871 A1 | 8/2008 | Horak et al. |
| 2008/0249791 A1 | 10/2008 | Iyer |
| 2008/0271143 A1 | 10/2008 | Stephens et al. |
| 2009/0006589 A1 | 1/2009 | Forbes et al. |
| 2009/0033487 A1 | 2/2009 | McFadden et al. |
| 2009/0063122 A1 | 3/2009 | Nasle |
| 2009/0119142 A1 | 5/2009 | Yenni et al. |
| 2009/0236538 A1 | 9/2009 | Frank |
| 2010/0274592 A1 | 10/2010 | Nitzan et al. |
| 2011/0074596 A1 | 3/2011 | Frohlick et al. |
| 2011/0148905 A1 | 6/2011 | Simmons et al. |
| 2011/0153655 A1 | 6/2011 | Kim et al. |
| 2011/0161885 A1 | 6/2011 | Gonia et al. |
| 2011/0193704 A1 | 8/2011 | Harper et al. |
| 2012/0001754 A1 | 1/2012 | Kraus et al. |
| 2012/0002733 A1 | 1/2012 | Misra et al. |
| 2012/0042326 A1 | 2/2012 | Jain et al. |
| 2012/0150783 A1 | 6/2012 | Jung et al. |
| 2012/0197911 A1 | 8/2012 | Banka et al. |
| 2012/0212574 A1 | 8/2012 | Blumenfeld |
| 2012/0280798 A1 | 11/2012 | Li et al. |
| 2012/0313779 A1 | 12/2012 | Papaefstathiou et al. |
| 2012/0323623 A1 | 12/2012 | Sabharwal |
| 2013/0009780 A1 | 1/2013 | Marshall et al. |
| 2013/0124597 A1 | 5/2013 | Diao et al. |
| 2013/0176467 A1 | 7/2013 | Lin |
| 2013/0184031 A1* | 7/2013 | Pollington ............ H04W 88/02 455/556.1 |
| 2013/0262349 A1 | 10/2013 | Bouqata et al. |
| 2013/0304385 A1 | 11/2013 | Gillette, II |
| 2013/0338465 A1 | 12/2013 | Taub et al. |
| 2014/0028457 A1 | 1/2014 | Reinpoldt et al. |
| 2014/0074982 A1 | 3/2014 | Misra et al. |
| 2014/0118123 A1 | 5/2014 | Lim et al. |
| 2014/0266793 A1 | 9/2014 | Velado et al. |
| 2014/0278646 A1 | 9/2014 | Adrian et al. |
| 2014/0280319 A1* | 9/2014 | Rishe ............... G06F 17/30241 707/769 |
| 2014/0287782 A1 | 9/2014 | Davis et al. |
| 2014/0347186 A1 | 11/2014 | Harper et al. |
| 2014/0347483 A1 | 11/2014 | Nakanishi et al. |
| 2015/0178657 A1 | 6/2015 | Kleehammer et al. |
| 2015/0189005 A1 | 7/2015 | Dubois et al. |
| 2015/0192682 A1 | 7/2015 | Valentino et al. |
| 2015/0213631 A1 | 7/2015 | VanderBroek |
| 2015/0213703 A1 | 7/2015 | Filson et al. |
| 2015/0248275 A1 | 9/2015 | Gallo et al. |
| 2015/0339594 A1 | 11/2015 | Gallo et al. |

FOREIGN PATENT DOCUMENTS

| | | |
|---|---|---|
| KR | 100900937 B1 | 6/2009 |
| KR | 1020110053145 A | 5/2011 |
| KR | 1020130038549 A | 4/2013 |
| KR | 1020130115445 A | 10/2013 |

OTHER PUBLICATIONS

International Search Report for serial No. PCT/US2015/031644 mailed Aug. 27, 2015.

International Search Report for serial No. PCT/US2015/031825 mailed Aug. 11, 2015.

International Search Report for serial No. PCT/US2015/031835 mailed Aug. 26, 2015.

Department of Climate Change and Energy Efficiency, National Greenhouse and Energy Reporting System Measurement: Technical Guidelines for the estimation of greenhouse gas emissions by facilities in Australia (Department of Climate Change and Energy Efficiency, 2012).

Gunther Schadow et al., The Unified Code for Units of Measure, (2009) http://web.archive.org/web/20130116071912/http://unitsofmeasure.org/ucum.html.

Aberer, Karl, Hauswirth, Manfred, Salehi, Ali, "Infrastructure for data processing in large-scale interconnected sensor networks", 2007, IEEE pp. 198-205.

* cited by examiner

Time Series Data

Day 1

| Time | Incoming | Inventory | Outgoing | Level |
|---|---|---|---|---|
| 00:00 | | 100 | | 100 |
| 01:00 | | | | 100 |
| 02:00 | | | | 100 |
| 03:00 | | | | 100 |
| 04:00 | | | | 100 |
| 05:00 | | | | 100 |
| 06:00 | | | | 100 |
| 07:00 | 10 | | | 110 |
| 08:00 | | | | 110 |
| 09:00 | | | | 110 |
| 10:00 | | | 20 | 90 |
| 11:00 | | | | 90 |
| 12:00 | | | | 90 |
| 13:00 | 10 | | | 100 |
| 14:00 | | | | 100 |
| 15:00 | | | | 100 |
| 16:00 | | | 50 | 50 |
| 17:00 | | | | 50 |
| 18:00 | | | | 50 |
| 19:00 | | | | 50 |
| 20:00 | | | | 50 |
| 21:00 | | | | 50 |
| 22:00 | | | | 50 |
| 23:00 | | | | 50 |

Day 2

| Time | Incoming | Inventory | Outgoing | Level |
|---|---|---|---|---|
| 00:00 | | | 50 | 50 |

FIGURE 2

Domain Attributes

Domain Attributes

Domain Attributes

Domain Attributes

Domain Attributes

Domain Attributes

Domain Attributes

Domain Attributes

Domain Attributes

Domain Attributes

Time Series Resolution

Gauge A

Resolution: Every second

| Date | Time | Value |
|---|---|---|
| 20120101 | 13:00:00 | 12 |
| 20120101 | 13:00:01 | 5 |
| 20120101 | 13:00:02 | 3 |
| 20120101 | 13:00:03 | 1 |
| 20120101 | 13:00:04 | 4 |
| 20120101 | 13:00:05 | 2 |
| 20120101 | 13:00:06 | 7 |
| 20120101 | 13:00:07 | 5 |
| 20120101 | 13:00:08 | 10 |
| 20120101 | 13:00:09 | 11 |
| 20120101 | 13:00:10 | 9 |
| 20120101 | 13:00:11 | 6 |
| 20120101 | 13:00:12 | 12 |
| 20120101 | 13:00:13 | 11 |
| 20120101 | 13:00:14 | 6 |
| 20120101 | 13:00:15 | 4 |

Gauge B

Resolution: once a day at 1pm

| Date | Time | Value |
|---|---|---|
| 20120101 | 13:00:00 | 1 |
| 20120102 | 13:00:00 | 52 |
| 20120103 | 13:00:00 | 13 |
| 20120104 | 13:00:00 | 7 |
| 20120105 | 13:00:00 | 4 |
| 20120106 | 13:00:00 | 5 |
| 20120107 | 13:00:00 | 7 |
| 20120108 | 13:00:00 | 5 |
| 20120109 | 13:00:00 | 15 |
| 20120110 | 13:00:00 | 6 |
| 20120111 | 13:00:00 | 5 |
| 20120112 | 13:00:00 | 5 |
| 20120113 | 13:00:00 | 12 |
| 20120114 | 13:00:00 | 11 |
| 20120115 | 13:00:00 | 6 |
| 20120116 | 13:00:00 | 4 |

Gauge C

Resolution: once a day at random times

| Date | Time | Value |
|---|---|---|
| 20120101 | 09:50:22 | 100 |
| 20120201 | 08:21:15 | 250 |
| 20120301 | 09:32:40 | 105 |
| 20120401 | 08:43:11 | 134 |
| 20120501 | 08:26:54 | 267 |
| 20120601 | 11:04:39 | 643 |
| 20120701 | 08:51:08 | 344 |
| 20120801 | 09:16:27 | 634 |
| 20120901 | 08:41:10 | 125 |
| 20121001 | 09:06:54 | 205 |
| 20121101 | 14:42:36 | 731 |
| 20121301 | 08:44:09 | 345 |
| 20130101 | 09:02:40 | 112 |
| 20130201 | 10:01:47 | 145 |
| 20130301 | 08:54:01 | 345 |
| 20130401 | 09:18:34 | 233 |

Gauge D

Resolution: random date and time

| Date | Time | Value |
|---|---|---|
| 20120101 | 09:20:12 | 10.2 |
| 20120109 | 18:41:45 | 12.5 |
| 20120211 | 09:12:20 | 80.4 |
| 20120415 | 08:33:31 | 22.3 |
| 20120416 | 22:16:54 | 56.7 |
| 20120421 | 14:04:29 | 45.7 |
| 20120529 | 12:31:18 | 86.1 |
| 20121014 | 09:06:17 | 34.6 |
| 20130101 | 08:11:30 | 77.1 |
| 20130101 | 13:36:24 | 94.1 |
| 20130112 | 14:52:56 | 54.4 |
| 20130116 | 06:24:29 | 65.8 |
| 20130116 | 05:12:10 | 32.1 |
| 20130122 | 11:41:11 | 79.0 |
| 20130202 | 21:54:21 | 54.2 |
| 20130225 | 17:18:13 | 17.3 |

FIGURE 10

Gas Sampling Gauges

Gas Sampling Gauges — 1102

| Date | Time | EC$_i$ | CH$_4$ | CO$_2$ | N | H$_2$O |
|---|---|---|---|---|---|---|
| 20120101 | 13:00:00 | 0.0391 | 82% | 8% | 5% | 5% |
| 20120201 | 13:00:00 | 0.0394 | 82% | 8% | 5% | 5% |
| 20120301 | 13:00:00 | 0.0392 | 80% | 6% | 8% | 6% |
| 20120401 | 13:00:00 | 0.0395 | 84% | 5% | 6% | 5% |
| 20120501 | 13:00:00 | 0.0392 | 82% | 8% | 5% | 5% |
| 20120601 | 13:00:00 | 0.0391 | 81% | 9% | 5% | 5% |
| 20120701 | 13:00:00 | 0.0392 | 81% | 9% | 5% | 5% |
| 20120801 | 13:00:00 | 0.0390 | 79% | 5% | 6% | 5% |
| 20120901 | 13:00:00 | 0.0391 | 80% | 6% | 8% | 6% |
| 20121001 | 13:00:00 | 0.0395 | 84% | 6% | 5% | 5% |
| 20121101 | 13:00:00 | 0.0398 | 85% | 5% | 5% | 5% |
| 20121201 | 13:00:00 | 0.0389 | 79% | 6% | 9% | 6% |

Resolution once a month at 1pm

Gauge Q$_i$ — 1101

| Date | Time | Value |
|---|---|---|
| 20120102 | 09:50:22 | 100 |
| 20120116 | 08:21:15 | 250 |
| 20120202 | 09:32:40 | 105 |
| 20120217 | 08:43:11 | 134 |
| 20120305 | 08:26:54 | 267 |
| 20120320 | 11:04:39 | 243 |
| 20120412 | 08:51:08 | 244 |
| 20120429 | 09:16:27 | 234 |
| 20120515 | 08:41:10 | 325 |
| 20120603 | 09:06:54 | 205 |
| 20120702 | 14:42:36 | 231 |
| 20130813 | 08:44:09 | 245 |
| 20120903 | 09:02:40 | 212 |
| 20121001 | 10:01:47 | 245 |
| 20121102 | 08:54:01 | 245 |
| 20121206 | 09:18:34 | 233 |

Resolution multiple times a month at random times

Gauge EF$_{iCO2oxec}$ — 1103

| Date | Time | Value |
|---|---|---|
| 20120101 | 13:00:00 | 0.3341 |
| 20120201 | 13:00:00 | 0.3315 |
| 20120301 | 13:00:00 | 0.3092 |
| 20120401 | 13:00:00 | 0.3109 |
| 20120501 | 13:00:00 | 0.3332 |
| 20120601 | 13:00:00 | 0.3397 |
| 20120701 | 13:00:00 | 0.3388 |
| 20120801 | 13:00:00 | 0.2987 |
| 20120901 | 13:00:00 | 0.3100 |
| 20121001 | 13:00:00 | 0.3196 |
| 20121101 | 13:00:00 | 0.3117 |
| 20121201 | 13:00:00 | 0.3084 |

Resolution once a month at 1pm

FIGURE 11

Gas Sampling Inputs                                1201

Inputs for Formula $E_{iCO2}$

Resolution
multiple times a month
at random times

As $Ec_i$ and $EF_{iCO2oxec}$ are state gauges, the system is able to match a reading with that of a reading in gauge $Q_i$ (underlined)

| Date | Time | $Q_i$ | $EC_i$ | $EF_{iCO2oxec}$ |
|---|---|---|---|---|
| 20120101 | 13:00:00 |  | 0.0391 | 0.3341 |
| 20120102 | 09:50:22 | 100 | 0.0391 | 0.3341 |
| 20120116 | 08:21:15 | 250 | 0.0391 | 0.3341 |
| 20120201 | 13:00:00 |  | 0.0394 | 0.3315 |
| 20120202 | 09:32:40 | 105 | 0.0394 | 0.3315 |
| 20120217 | 08:43:11 | 134 | 0.0394 | 0.3315 |
| 20120301 | 13:00:00 |  | 0.0392 | 0.3092 |
| 20120305 | 08:26:54 | 267 | 0.0392 | 0.3092 |
| 20120320 | 11:04:39 | 243 | 0.0392 | 0.3092 |
| 20120401 | 13:00:00 |  | 0.0395 | 0.3109 |
| 20120412 | 08:51:08 | 244 | 0.0395 | 0.3109 |
| 20120429 | 09:16:27 | 234 | 0.0395 | 0.3109 |
| 20120501 | 13:00:00 |  | 0.0392 | 0.3332 |
| 20120515 | 08:41:10 | 225 | 0.0392 | 0.3332 |
| 20120601 | 13:00:00 |  | 0.0391 | 0.3397 |
| 20120603 | 09:06:54 | 206 | 0.0391 | 0.3397 |
| 20120701 | 13:00:00 |  | 0.0392 | 0.3388 |
| 20120702 | 14:42:36 | 231 | 0.0392 | 0.3388 |
| 20120801 | 13:00:00 |  | 0.0390 | 0.2987 |
| 20120812 | 08:44:09 | 245 | 0.0390 | 0.2987 |
| 20120901 | 13:00:00 |  | 0.0391 | 0.3100 |
| 20120903 | 09:02:40 | 212 | 0.0391 | 0.3100 |
| 20121001 | 10:01:47 | 245 | 0.0391 | 0.3100 |
| 20121001 | 13:00:00 |  | 0.0395 | 0.3196 |
| 20121101 | 13:00:00 |  | 0.0398 | 0.3117 |
| 20121102 | 08:54:01 | 245 | 0.0398 | 0.3117 |
| 20121201 | 13:00:00 |  | 0.0389 | 0.3084 |
| 20121206 | 09:18:34 | 233 | 0.0389 | 0.3084 |

FIGURE 12

Warehouse Bundles                                          1301

Warehouse Bundles

| Date | Time | Aggregation | Q | EC | EF$_{CO2sec}$ |
|---|---|---|---|---|---|
| 20120131 | 23:59:59 | sum | 350.0 | 0.0391 | 0.3341 |
|  |  | average | 175.0 | 0.0391 | 0.3341 |
|  |  | minimum | 100.0 | 0.0391 | 0.3341 |
|  |  | maximum | 250.0 | 0.0391 | 0.3341 |
|  |  | first | 100.0 | 0.0391 | 0.3341 |
|  |  | last | 250.0 | 0.0391 | 0.3341 |
| 20120227 | 23:59:59 | sum | 239.0 | 0.0394 | 0.3315 |
|  |  | average | 119.5 | 0.0394 | 0.3315 |
|  |  | minimum | 105.0 | 0.0394 | 0.3315 |
|  |  | maximum | 134.0 | 0.0394 | 0.3315 |
|  |  | first | 105.0 | 0.0394 | 0.3315 |
|  |  | last | 134.0 | 0.0394 | 0.3315 |
| 20120331 | 23:59:59 | sum | 510.0 | 0.0392 | 0.3092 |
|  |  | average | 255.0 | 0.0392 | 0.3092 |
|  |  | minimum | 243.0 | 0.0392 | 0.3092 |
|  |  | maximum | 267.0 | 0.0392 | 0.3092 |
|  |  | first | 267.0 | 0.0392 | 0.3092 |
|  |  | last | 243.0 | 0.0392 | 0.3092 |
| 20120430 | 23:59:59 | sum | 478.0 | 0.0395 | 0.3109 |
|  |  | average | 239.0 | 0.0395 | 0.3109 |
|  |  | minimum | 234 | 0.0395 | 0.3109 |
|  |  | maximum | 244 | 0.0395 | 0.3109 |
|  |  | first | 244 | 0.0395 | 0.3109 |
|  |  | last | 234 | 0.0395 | 0.3109 |

Resolution
Readings aggregated to values per month

1302

Warehouse Bundles

| Date | Time | Aggregation | Q | EC | EF$_{CO2sec}$ |
|---|---|---|---|---|---|
| 20120131 | 23:59:59 | sum | 350.0 | 0.0391 | 0.3341 |
| 20120227 | 23:59:59 | sum | 239.0 | 0.0394 | 0.3315 |
| 20120331 | 23:59:59 | sum | 510.0 | 0.0392 | 0.3092 |
| 20120430 | 23:59:59 | sum | 478.0 | 0.0395 | 0.3109 |

Resolution
Readings aggregated to values per month showing only sum

FIGURE 13

Warehouse Bundle Aggregation                    1501

Metal Works Division

| Date | Time | Aggregation | Q | EC | EF$_{CO2eee}$ |
|---|---|---|---|---|---|
| 20120131 | 23:59:59 | sum | 1,158.0 | 0.0391 | 0.3341 |
| 20120227 | 23:59:59 | sum | 740.0 | 0.0394 | 0.3315 |
| 20120331 | 23:59:59 | sum | 1,500.0 | 0.0392 | 0.3092 |
| 20120430 | 23:59:59 | sum | 1,434.0 | 0.0395 | 0.3109 |

Resolution
Readings aggregated to values per month showing only sum

FIGURE 15

USER QUERY AND GAUGE-READING RELATIONSHIPS

CROSS REFERENCE

This application claims the benefit and priority to Philippines Patent Application No. 1/2013/000136, filed May 23, 2013, which is incorporated herein by reference in its entirety.

This application is a continuation in part of U.S. patent application Ser. No. 14/281,896, filed May 20, 2014, entitled "SENSOR BASED DETECTION SYSTEM", by Joseph L. Gallo et al. and incorporated by reference herein.

This application is a continuation in part of U.S. patent application Ser. No. 14/281,901, filed May 20, 2014, entitled "SENSOR MANAGEMENT AND SENSOR ANALYTICS SYSTEM", by Joseph L. Gallo et al. and incorporated by reference herein.

This application is a continuation in part of U.S. patent application Ser. No. 14/281,904, filed May 20, 2014, entitled "EVENT MANAGEMENT FOR A SENSOR BASED DETECTION SYSTEM", by Joseph L. Gallo et al. and incorporated by reference herein.

BACKGROUND

Extracting and transforming data from complex domains is usually an expensive exercise that consumes a lot of system resources (i.e. CPU cycles, network bandwidth, and disk space). Hence, the concept of data warehouses was developed so data from different domains would be extracted and transformed once, and new data could be appended to it. Hence, the separate temporary database system would become a permanent system where the new extracts and transformations from the order and truck domains are being loaded into.

SUMMARY

Domain agnostic systems and methods for the capture, storage, and analysis of sensor readings are provided herein.

In some embodiments, a system server can provide a unified sensor reading database. Where previously different sensors would capture and maintain their own storage method, a system server can serve as the central data collection point.

In some embodiments, a system server can accommodate formulas, combining readings from a number of different gauges. This allows a system server to function as a calculation and analysis engine for extracting meaningful statistics from sensor readings.

In some embodiments, systems and methods can function as an alerting mechanism to provide situational awareness based on computer-readable code embodied therein.

DRAWINGS

FIG. 2 illustrates time series data captured by a gauge on two different days.

FIGS. 5A-5K provide domain attributes according to some embodiments.

Figure 6:
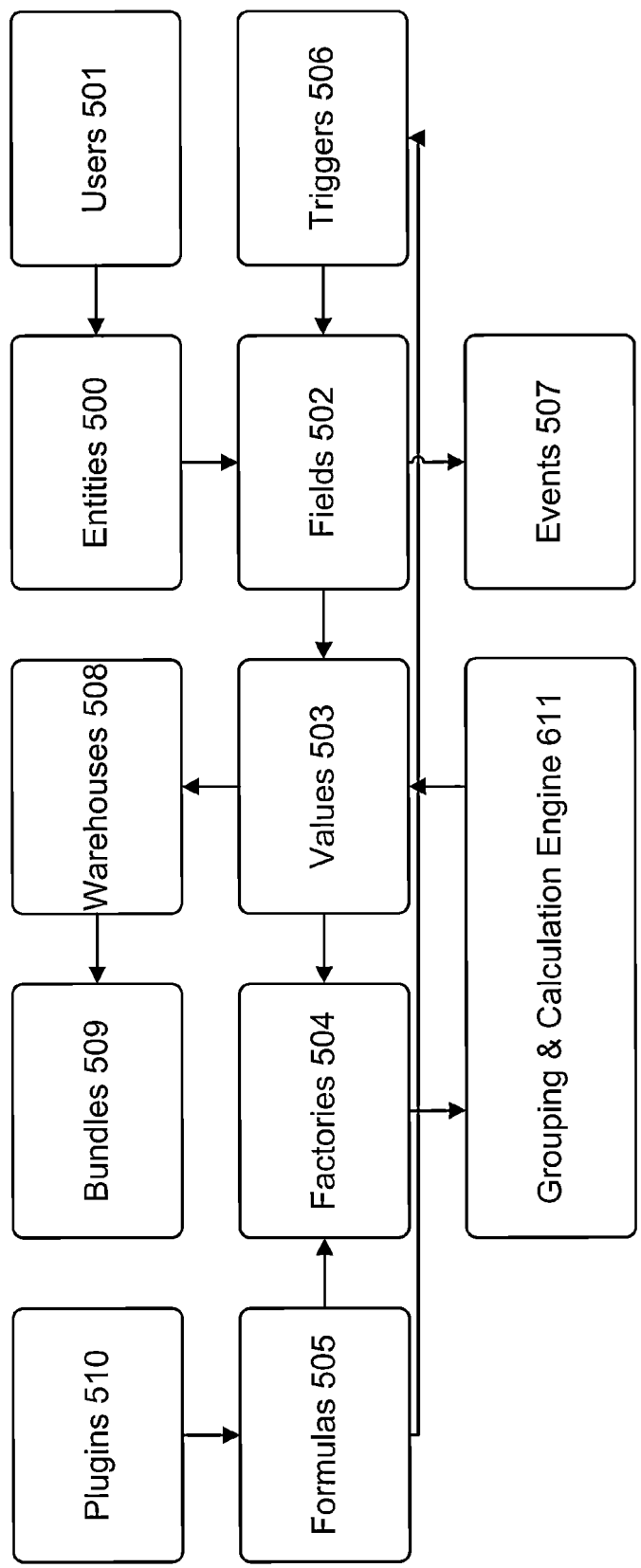

FIG. 6 illustrates a graphical representation of the logical modules according to some embodiments.

Figure 7:
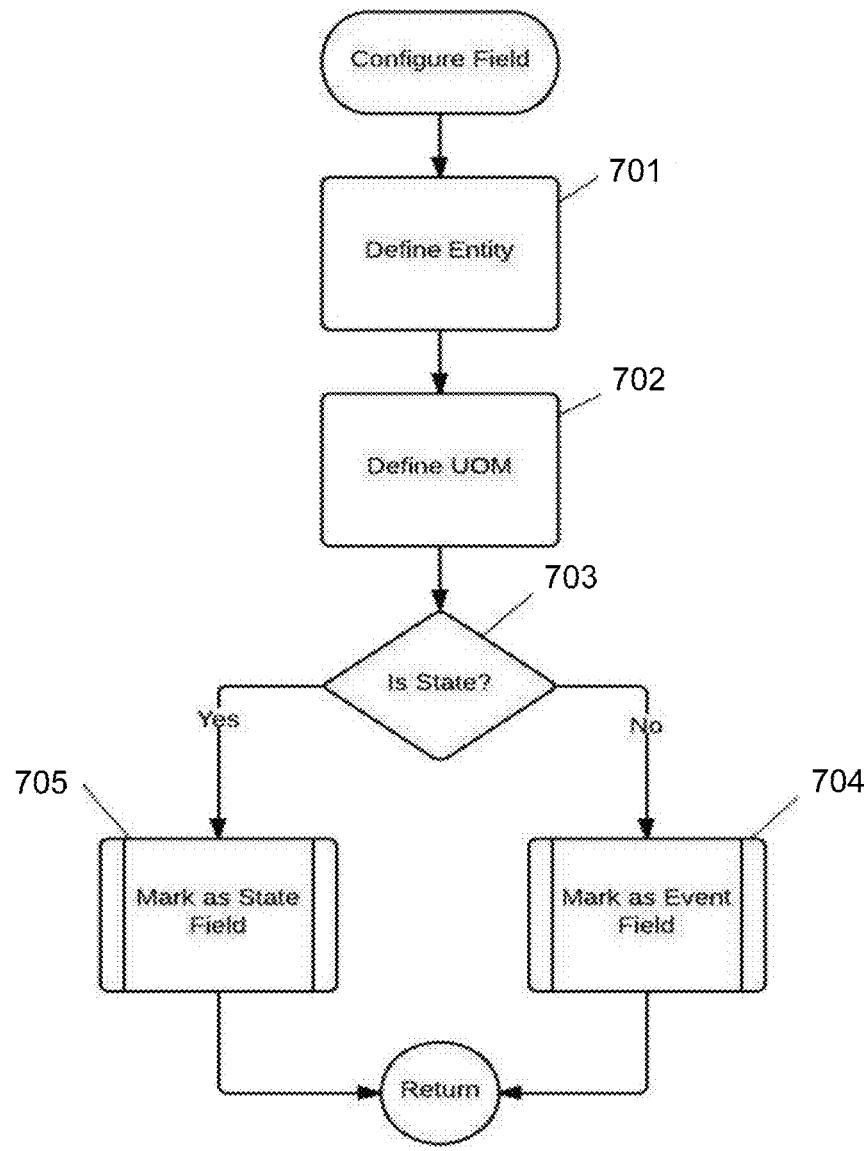

FIG. 7 provides field domain actions according to some embodiments.

Figure 8:
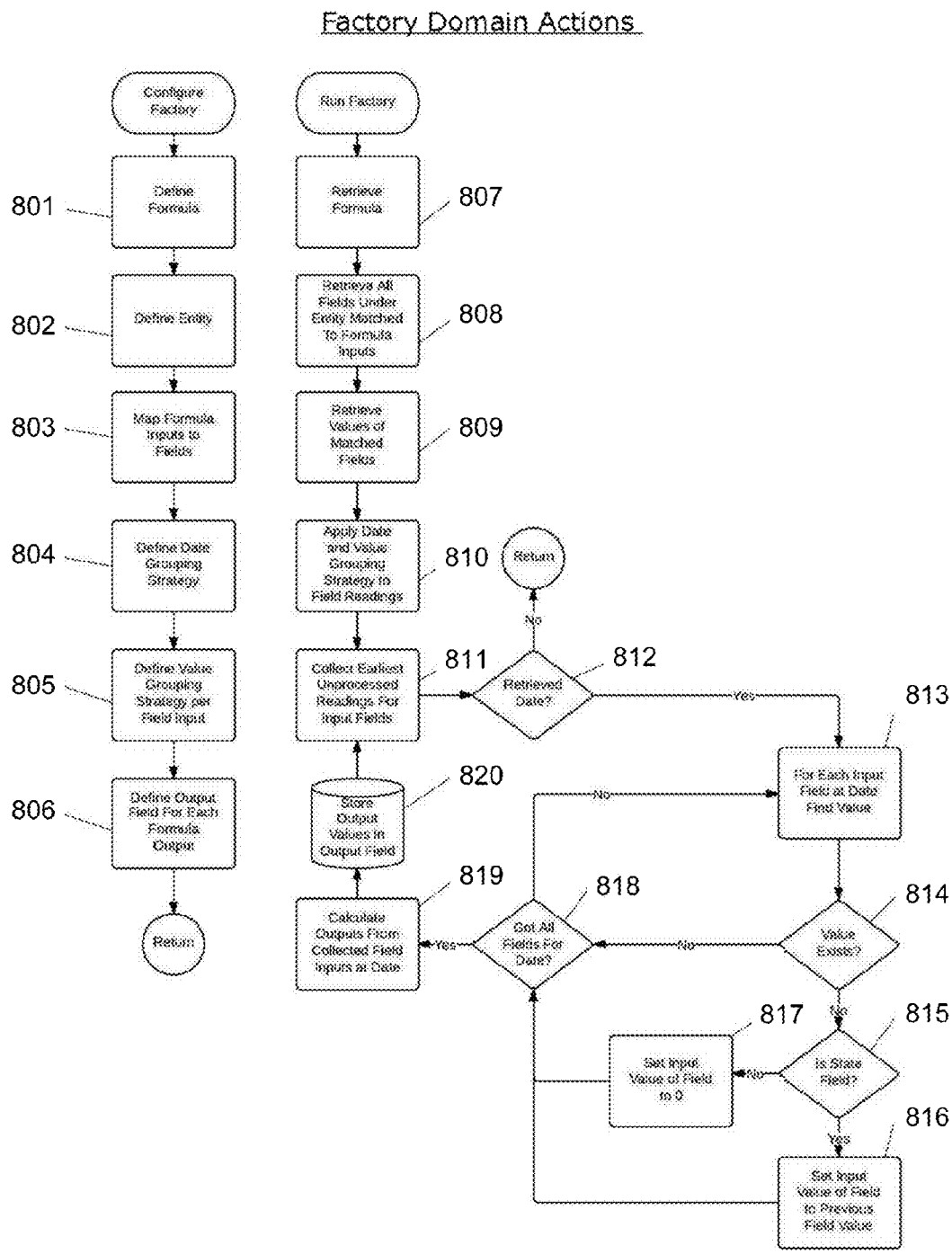

FIG. 8 provides factory domain actions according to some embodiments.

Figure 9:
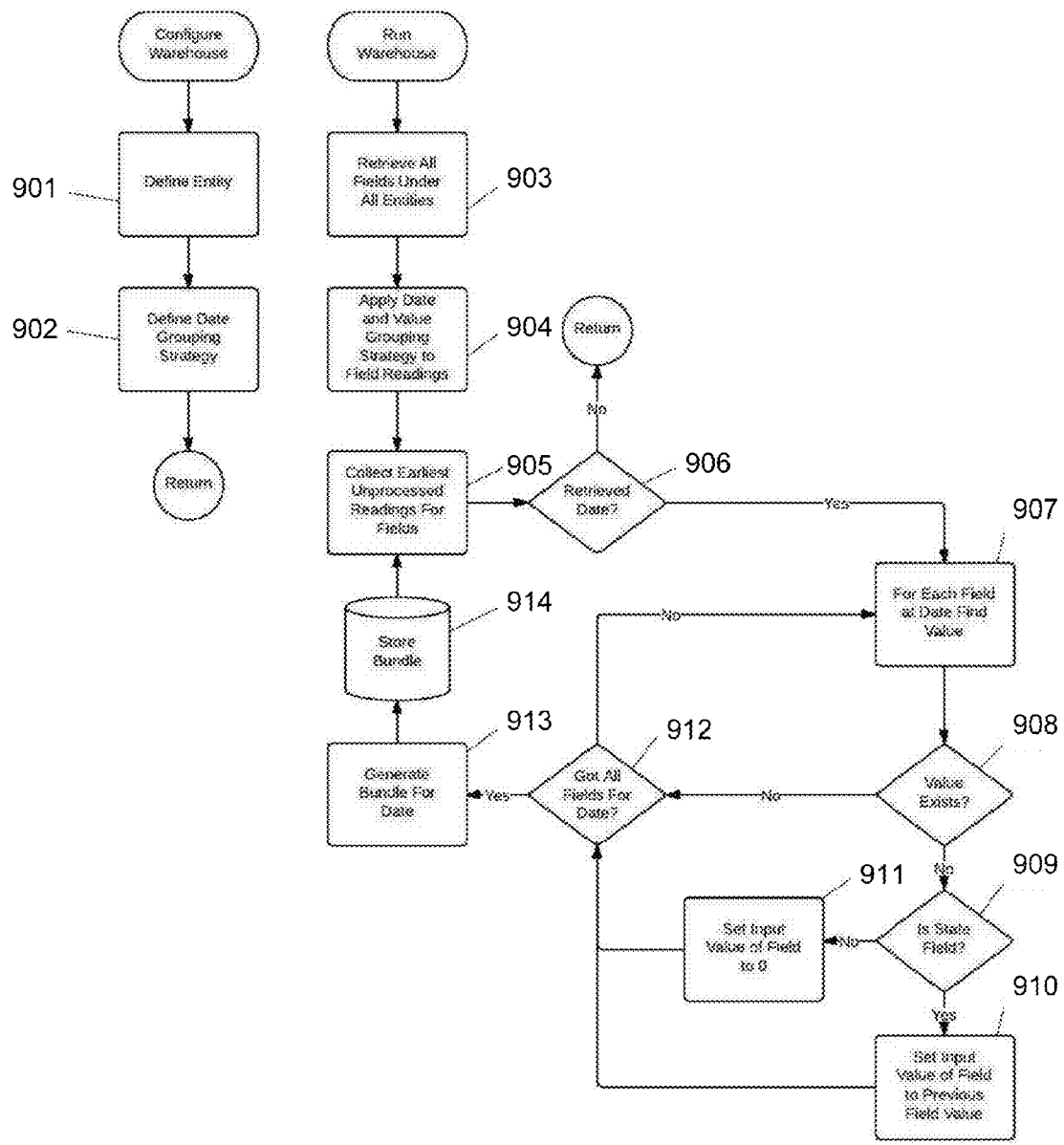

FIG. 9 provides warehouse domain actions according to some embodiments.

FIG. 10 illustrates gauges with different resolution for capturing readings.

FIG. 11 provides an example of readings from gas sampling gauges.

FIG. 12 provides an overview of the values generated by a system server.

FIG. 13 shows the gauge readings from some gas sampling gauges and calculated values in a "Warehouse Bundle" format.

Figure 14:
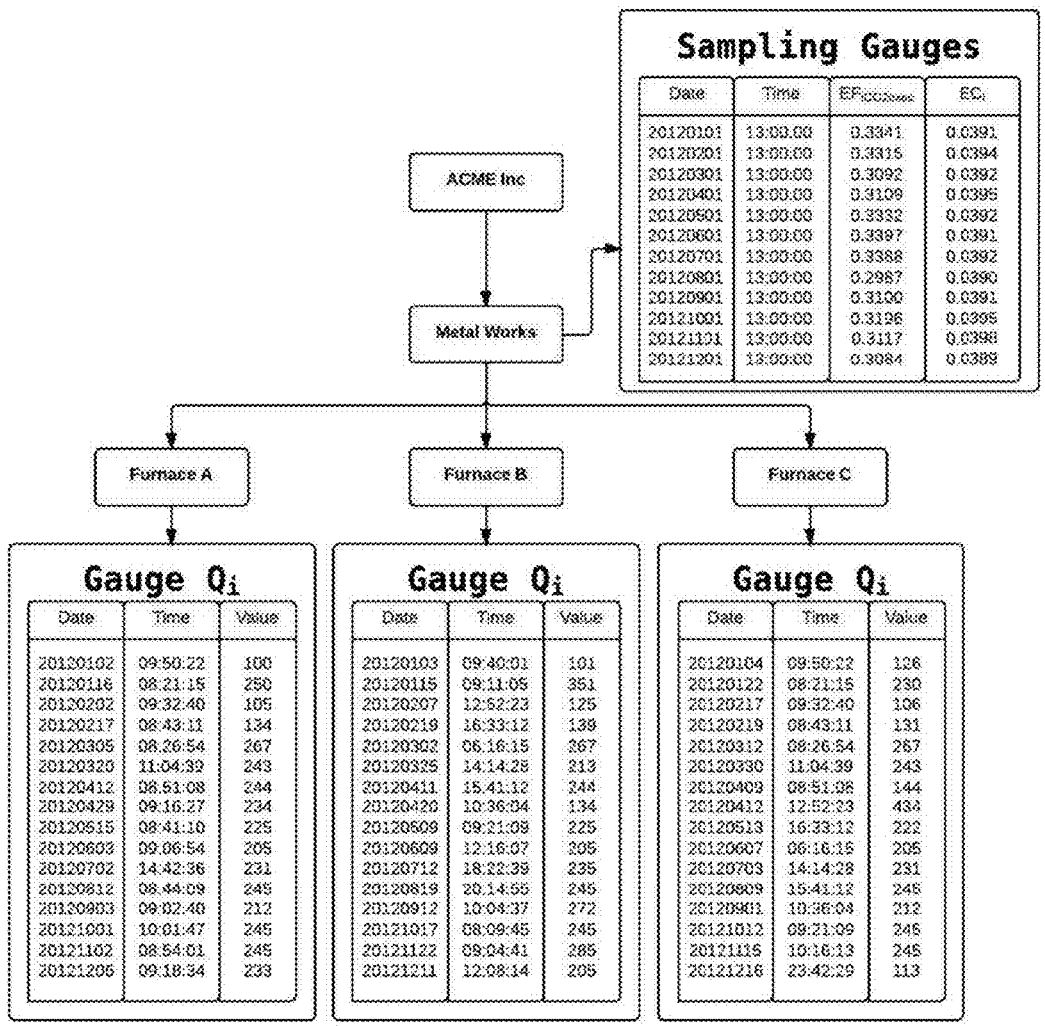

FIG. 14 shows the readings of different gauges arranged in a hierarchy.

FIG. 15 illustrates the results generated from aggregating the readings from different gauges up the hierarchy as depicted in FIG. 14.

Figure 16:
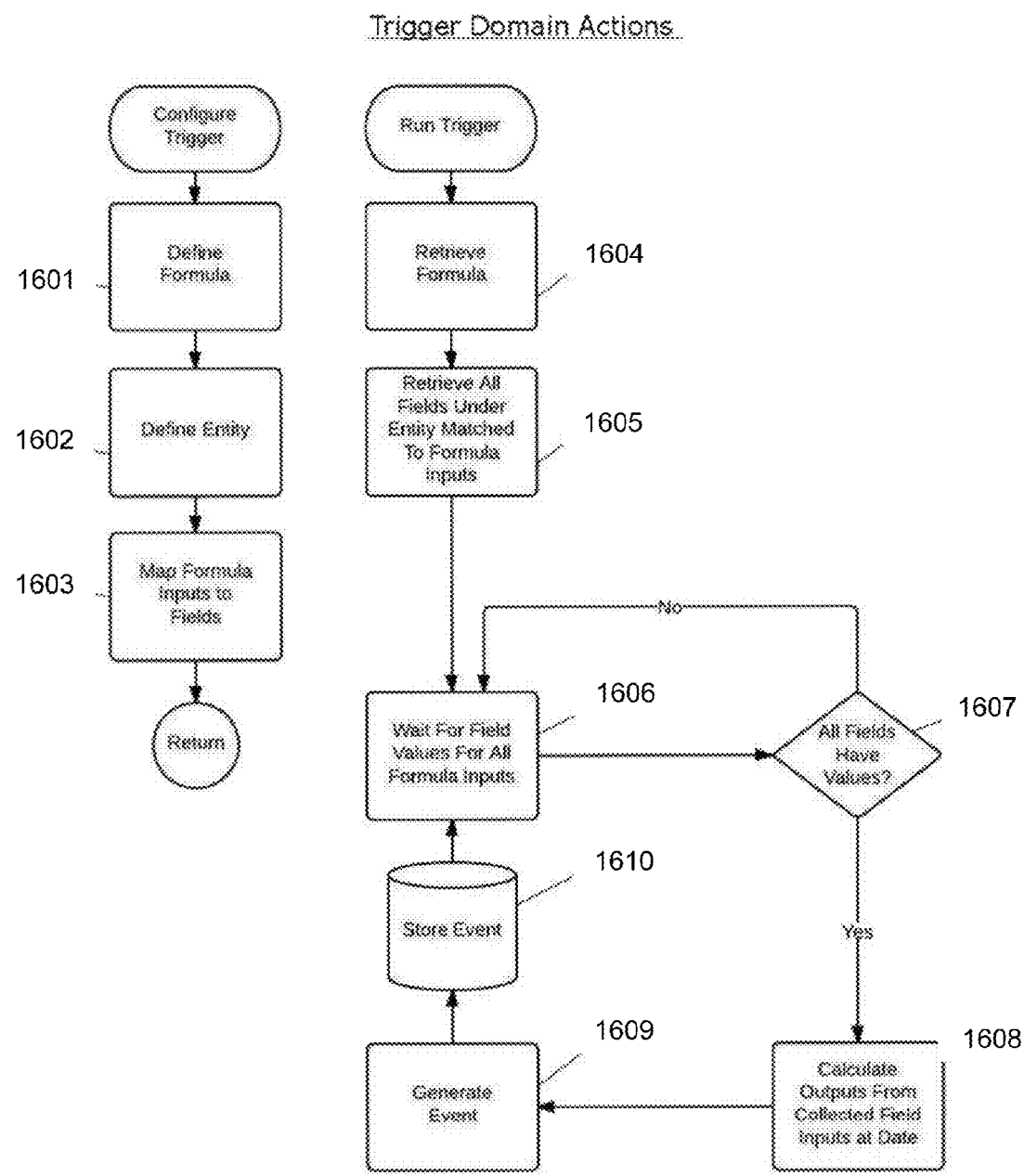

FIG. 16 provides trigger domain actions according to some embodiments.

DESCRIPTION

This disclosure relates to domain agnostic systems and methods for the capture, storage, and analysis of sensor readings. Such systems and methods include organizing the storage of metrics/sensor-readings from business domains. Such systems and methods address the desire to capture and store raw metrics data in a format that lends itself to time-series analysis and other 'big data' analytical procedures.

Gauges work on the premise that a metric can be considered a "gauge." One can have a gauge for one's daily water usage, a gauge for one's car fuel usage, a gauge to measure one's mood during the day, or a gauge for the cubic meters of carbon dioxide a coal mine vent discharges into the atmosphere. A gauge can be physical, virtual, or both. A gauge generates a key and an associated value, whereby the key is a timestamp and the value a numerical value. The combination of key and value is referred to herein as a "reading."

Adopting this concept of key+value=readings, data can be organized so a reading can be compared with another reading from another gauge. In fact, readings from gauges measuring unrelated activities can still be compared against each other. In effect, comparing "apples to oranges."

Being able to compare readings from gauges measuring different activities, even completely unrelated activities, is the domain agnostic aspect of systems and methods provided herein. To understand the concept of domain agnosticity, it is best described with an example.

Figure 1:
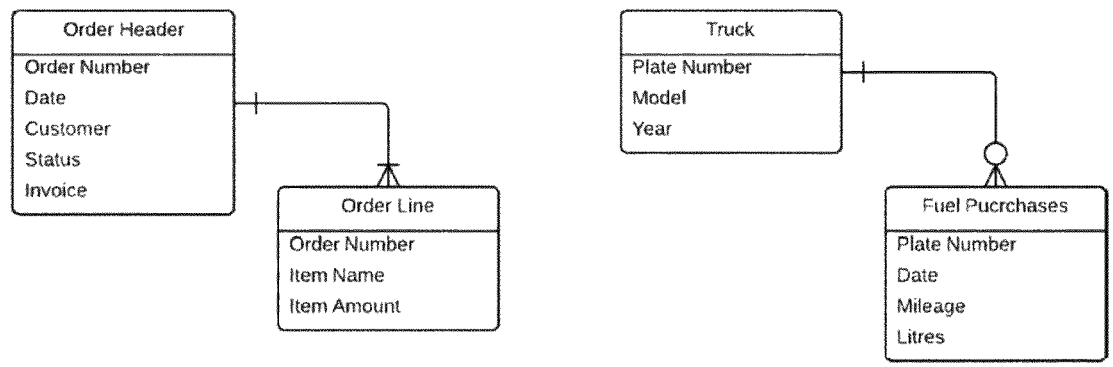
FIG. 1 shows a data model of an order and a truck.

As an example, assume an order entry system at a company that registers all orders that are processed. The orders are stored in a database schema specific to the type of orders processed by the company. In other words, the data is stored as part of the "order domain" shown in FIG. 1. Now assume that the logistics division that ships all orders has a procedure whereby the truck drivers register on a monthly basis all fuel purchased and mileage travelled in their logistics systems. Considering this data captured in the logistics system as part of the "truck domain" is shown in FIG. 1. As can be seen in FIG. 1, two different systems storing data in different schemas, i.e. different domain, are shown.

Presuming that a comparison of the amount of gas purchased with the amount of orders registered containing a certain type of product (e.g. Widget X) over a regular interval (e.g. by year) is desired. To achieve this, the data from the two systems using custom queries is extracted.

In the case of the truck domain, a query is created to extract all the fuel purchases over time with the relevant truck plate number. For the order domain, a query is created that selects all orders containing a particular product in their order lines. Now, the two extracts are stored into a separate temporary database system to transform them into a proper format for analysis. Since each data set has records that occur at different intervals, the data is aggregated to a common interval. For example, orders can come in per minute of the day, while fuel purchases may be registered on a monthly basis. Hence, the number of orders is aggregated to a monthly interval first. After the transformation is done, calculating metrics like "fuel purchased per year per Widget X" can be started. The aforementioned example here is an illustration, and it would not be too complicated to build a system to extract and transform the data from the order and truck domains. However, it is appreciated that domains are rarely like the example provided here. Typically domains have complex schemas that grow in complexity as the business grows and evolves, however, a similar concept as described herein is applied for more complex systems.

In the foregoing example, the steps organizations go through to set up a data warehousing solution is described. The first step is to design for each domain extraction, transformation, and loading processes or ETL modules. Next is to design a data warehouse schema that generates and accommodates the data generated by the ETL modules. Thirdly, the hardware to generate and store the data is acquired. Typically, projects that undertake these steps take a significant investment in both time and resources.

Today, many vendors offer data warehousing solutions to help companies execute their data warehousing projects. The products they offer use specialist knowledge to implement and maintain, and are often tied to specific domains.

The systems and methods provided herein take away the need for designing expensive ETL modules and purchasing specialized hardware by applying the concept of gauges. The order domain would be an order gauge, tracking each purchase of Widget X, whilst the truck domain would be a fuel gauge tracking the amount of fuel purchased per month. Through an Application Programming Interface (API), gauge readings may be sent to a system server for storage.

Once in a system server, the readings from different gauges can be aggregated to an interval. For example, in the sample metric provided above ("fuel purchased per year per Widget X"), a dataset containing these two gauges can be aggregated to a monthly interval.

There are two types of gauges: an event gauge, and a state gauge. FIG. 2 highlights the concept of event data and state data that is captured by gauges. The event gauge may be the default, and may be applicable to the given example. An order logged in the order entry system, or the fuel and mileage logged by the truck driver in the logistics system, are both discrete events. In other words, for an event, an event gauge generates a reading. State gauges, on the other hand, provide readings to measure the state of a system. The state of a system may be changing, but the new reading on the gauge can have the same value as the previous reading. An example of a state gauge is a gauge that measures inventory levels. In FIG. 2, there are three gauges: Incoming, Inventory, and Outgoing. The Incoming gauge measures the goods that are coming into the warehouse, and is an event gauge. The Outgoing gauge measures the goods that leave the warehouse, and is also an event gauge. The inventory gauge, on the other hand, is a state gauge, and it measures the level of the inventory at a specific moment in time.

By setting the appropriate gauge type, system formulas can properly calculate state changes when combining event gauges with state gauges. In the example above, the Level gauge readings are generated by the system server using a formula: Inventory−Outgoing+Incoming=Level. The inventory gauge generates a reading at 00:00 hours each day. On day 1, the inventory level is measured at 100 units. At 07:00 hours, an incoming event takes place. However, no inventory reading has happened, but because the inventory gauge is a state gauge, the system server can correctly calculate that the inventory level increased by 10 units, ensuring the Level gauge reads 110 units. At 10:00 hours, there is an outgoing event, and again, the system server is able to correctly determine that the Level reading should be 90. In short, by defining inventory as a state, the system server is able to calculate the correct inventory level a point in time. If inventory was 100 at 00:00 hours, the inventory may also be 100 units at 06:00 hours. The state of the inventory does not change unless a new state reading takes place (like that at 00:00 hours on Day 2) or an incoming or outgoing event has happened.

Domain agnostic systems and methods for the capture, storage, and analysis of sensor readings are provided herein. Such systems and methods can accommodate a wide variety of formulas, combining readings from a number of different gauges, etc.

A system server may be deployed as part of a network, which can be a wide area network (WAN), or a combination of local area network (LAN), and/or piconets. Such networks can be hard-wired, wireless, or a combination of both. A LAN can be a network within a single organization while WAN can be the Internet.

Figure 3:
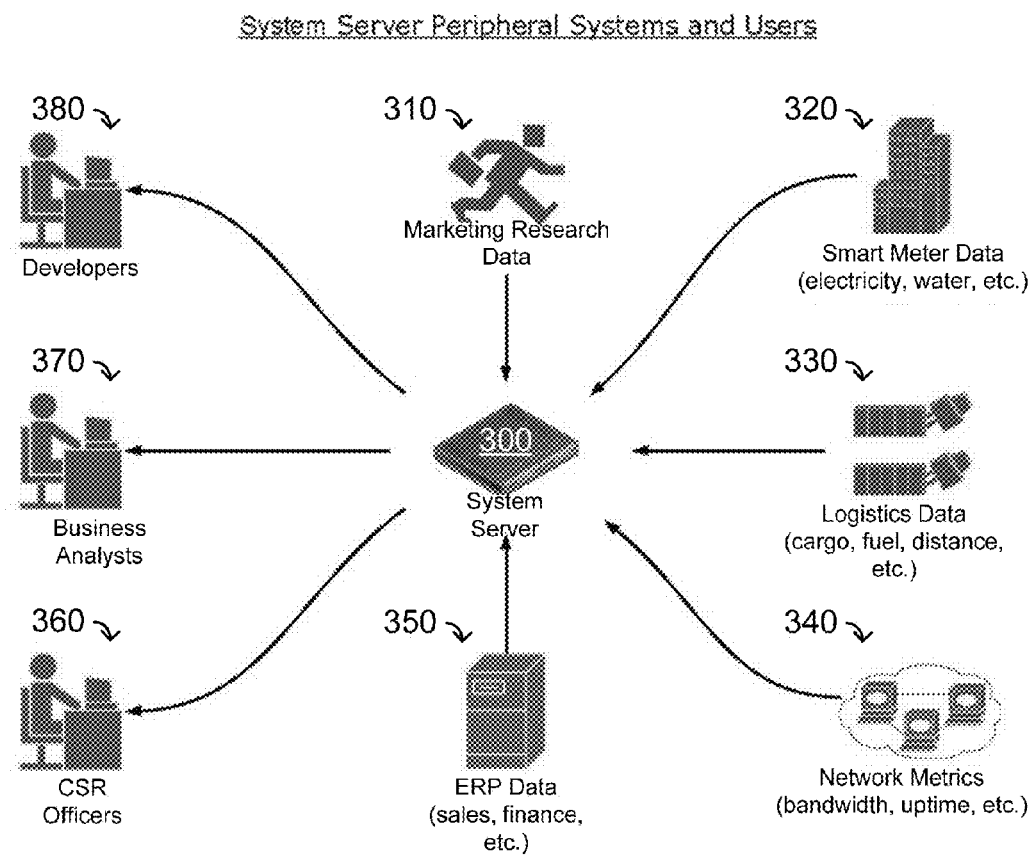
FIG. 3 depicts a system server interacting with other systems and users.

FIG. 3 depicts the system server interacting with other systems and users. Such other systems and users include "peripheral systems" to the system server 300 and include Marketing Research Data 310, Smart Meter Data 320, Logistics Data 330, Network Metrics 340, Enterprise Resource Planning (ERP) Data 350, Corporate Social Responsibility (CSR) Officers 360, Business Analysts 370, and Developers 380. Such peripheral systems may provide gauge readings that are stored within the system server. Users of the system server make use of the readings by extracting the readings, e.g., directly, or using the readings for calculations and further analysis.

Figure 4:
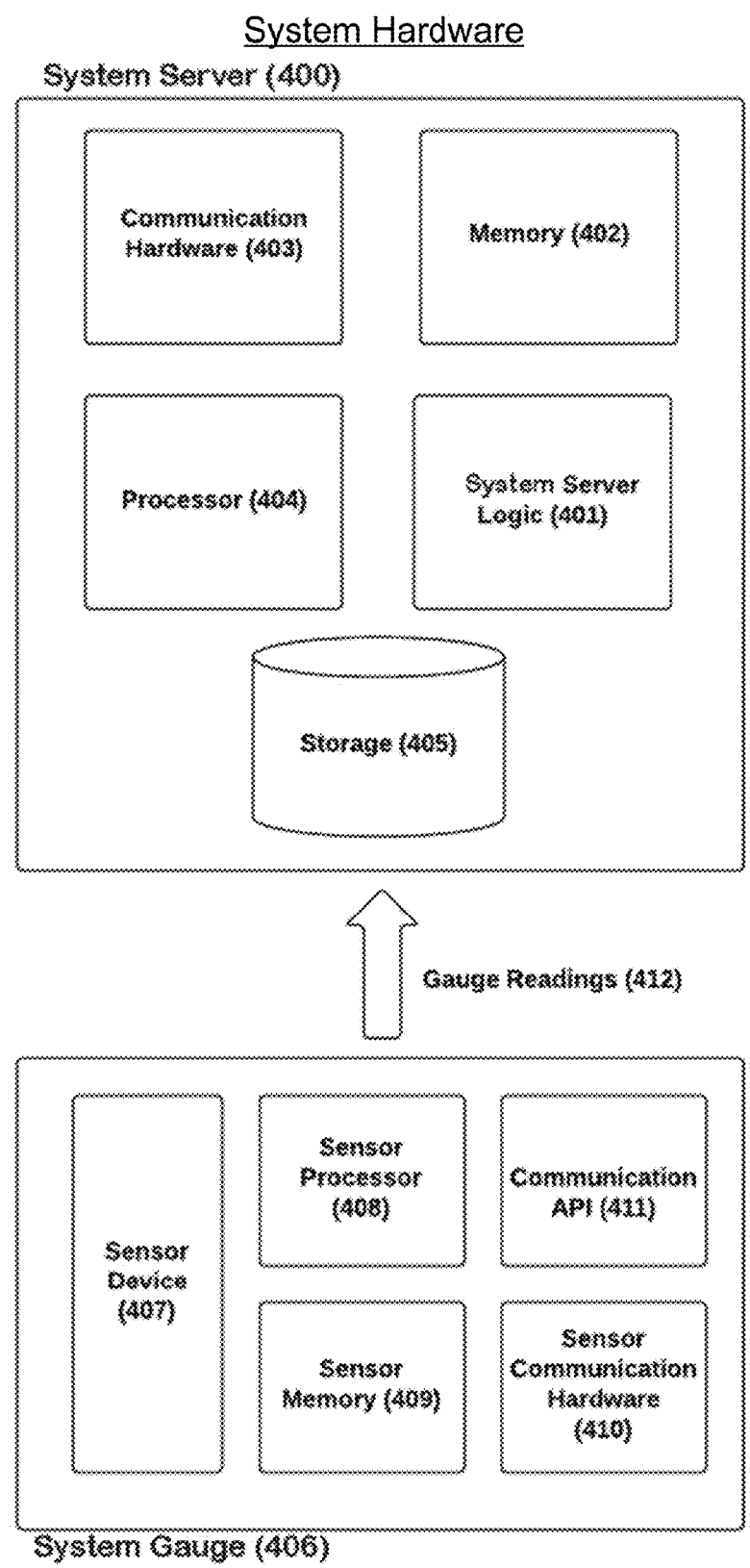
FIG. 4 illustrates a system server and system gauge according to some embodiments.

As shown in FIG. 4, the logic that embodies the system server 400 resides on hardware including logic 401, memory 402, communication hardware 403, processor 404, and storage 405. System server logic 401 is executed to process data as received through supported communication hardware 403, which is subsequently stored in storage 405 for future retrieval. Readings, e.g., gauge readings 412, can be provided to the system server through a system gauge 406 including sensor device 407, sensor processor 408, sensor memory 409, communication API 411, and sensor communication hardware 410. A system gauge 406 may contain a sensor device 407 to capture readings from the environment at an interval. A sensor device 407 can measure a changing value in its environment. Common examples may include temperature, luminosity, radiation levels, odometer, and even manual data entry. It is appreciated that the system server can also receive readings from non-system gauges as long as the communication method used to transmit the readings to the system server is compatible with a communication API 411 for the system.

Although the system server 400, system gauge 406, and its related systems provided herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Figure 5A:
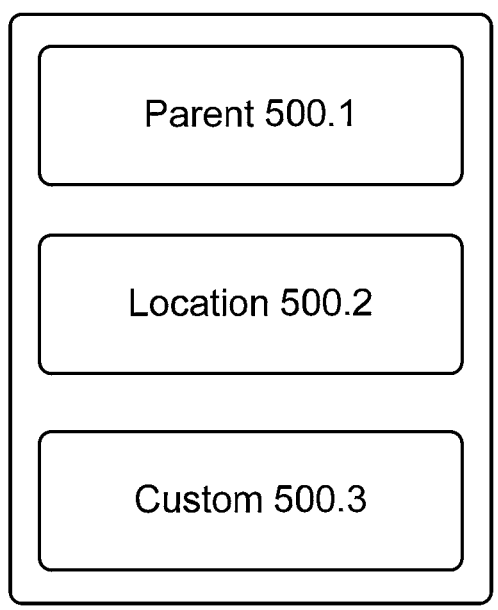
Figure 5B:
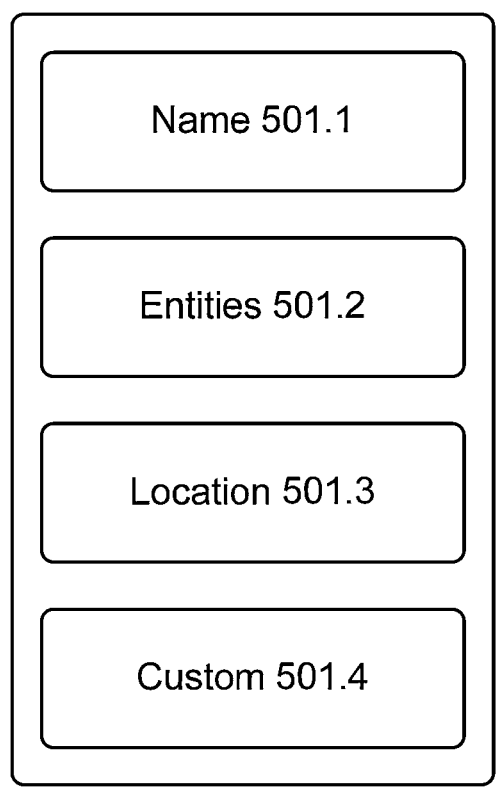
Figure 5C:
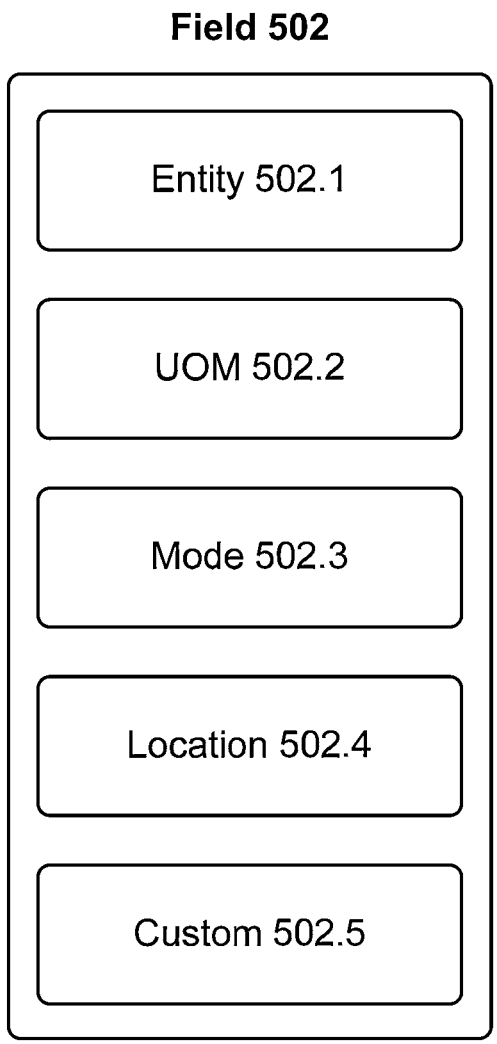
Figure 5D:
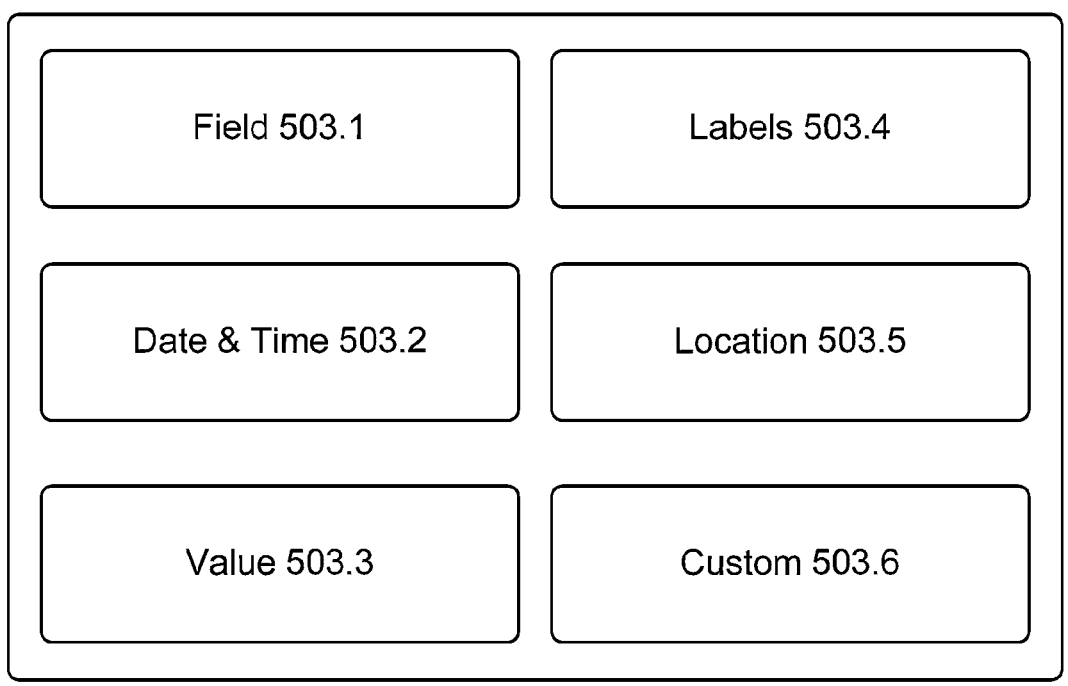
Figure 5E:
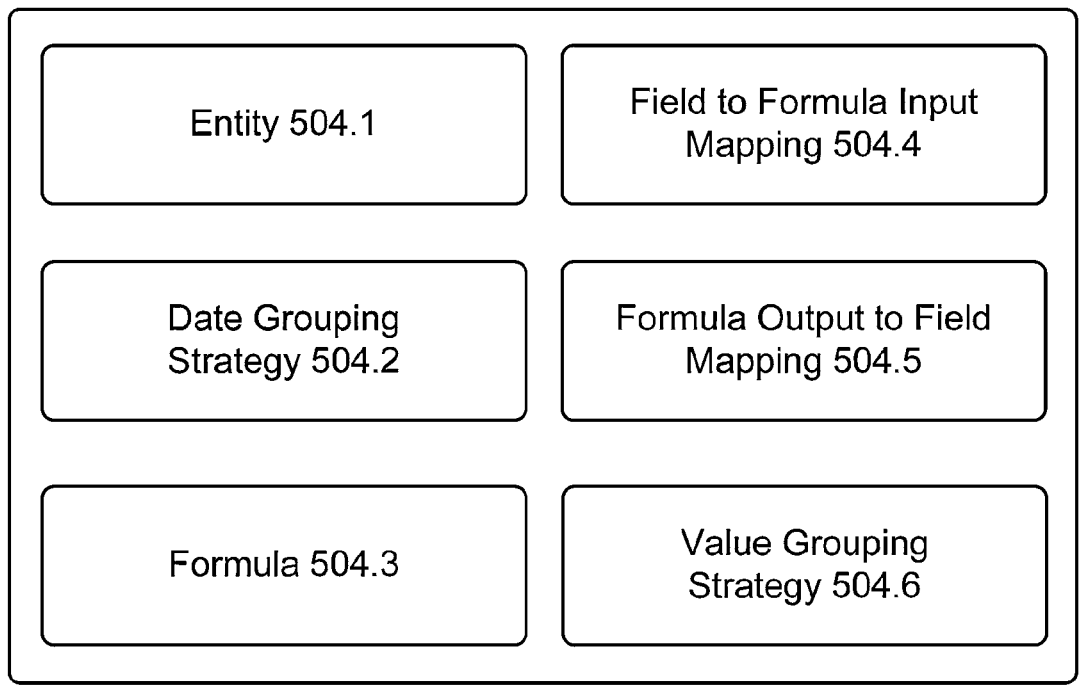
Figure 5F:
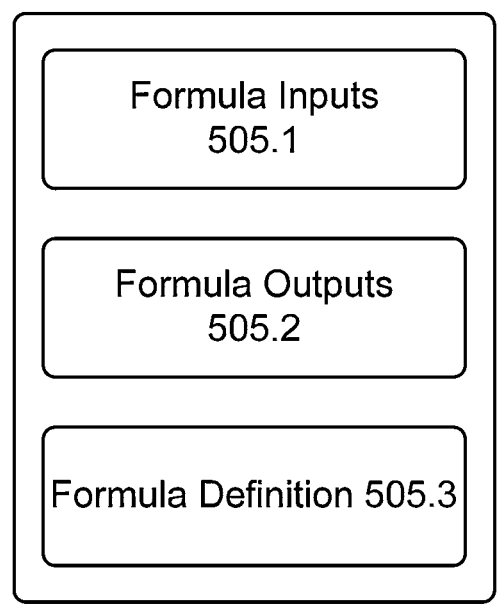
Figure 5G:
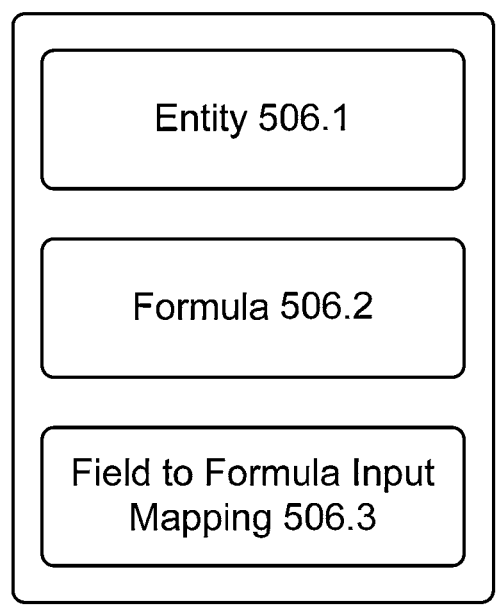
Figure 5H:
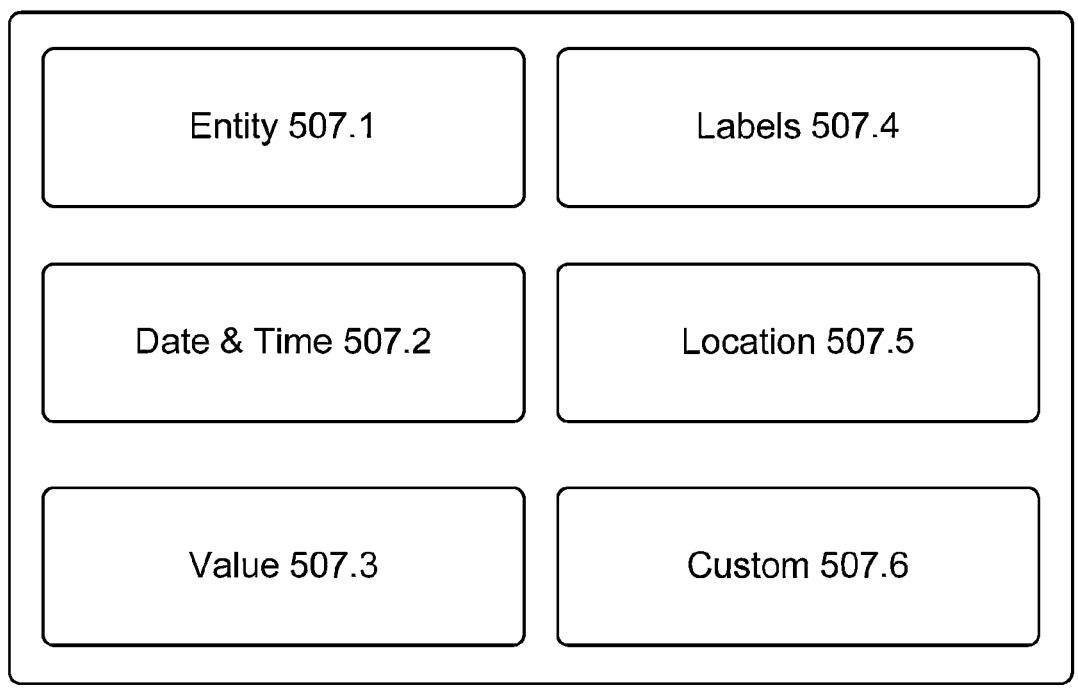
Figure 5I:
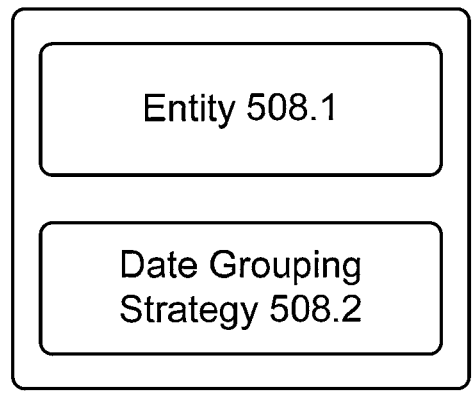
Figure 5J:
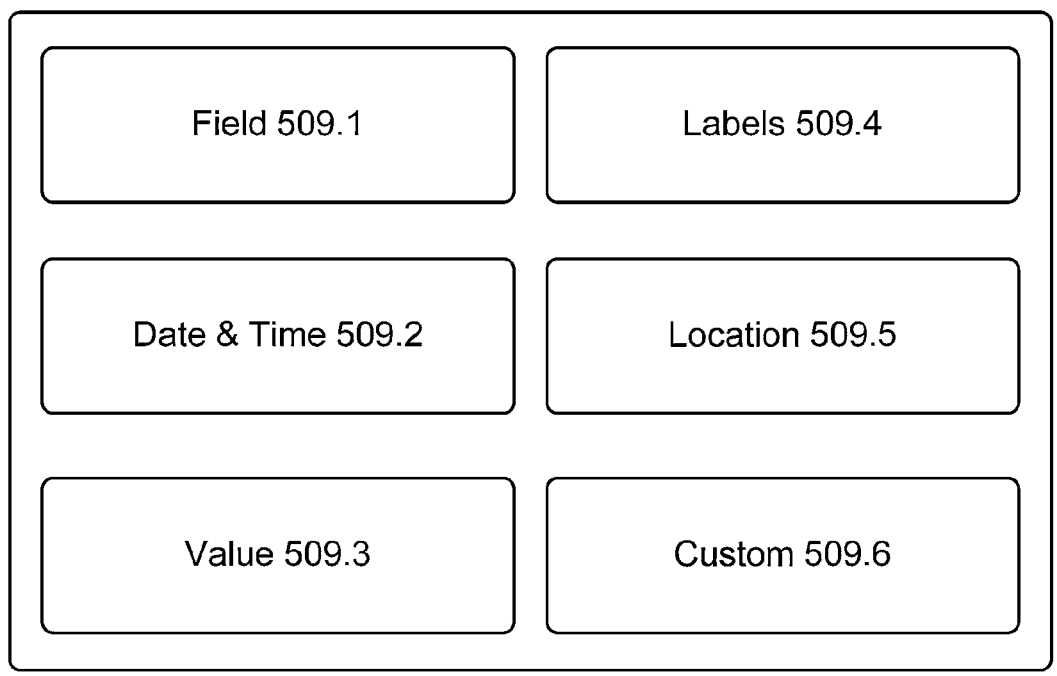
Figure 5K:
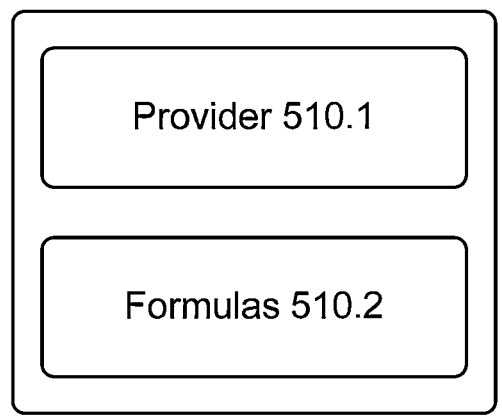

As depicted in FIGS. 5A-5K, the logic that embodies the system server 400 can be divided into the following logical modules: Entities 500 (FIG. 5A), Users 501 (FIG. 5B), Fields 502 (FIG. 5C), Values 503 (FIG. 5D), Factories 504 (FIG. 5E), Formulas 505 (FIG. 5F), Triggers 506 (FIG. 5G), Events 507 (FIG. 5H), Warehouses 508 (FIG. 5I), Bundles 509 (FIG. 5J), and Plugins 510 (FIG. 5K). As depicted in FIG. 6, the logic that embodies the system server may further include Grouping & Calculation Engine 611.

As shown in FIG. 5A, the system server may have domain attributes including Entity 500 including Parent 500.1, Location 500.2, and Custom 500.3.

As shown in FIG. 5B, the system server may have domain attributes including User 501 including Name 501.1, Entities 501.2, Location 501.3, and Custom 501.4.

As shown in FIG. 5C, the system server may have domain attributes including Field 502 including Entity 502.1, Unit of Measure (UOM) 502.2, Mode 502.3, Location 502.4, and Custom 502.5.

As shown in FIG. 5D, the system server may have domain attributes including Value 503 including Field 503.1, Date & Time 503.2, Value 503.3, Labels 503.4, Location 503.5, and Custom 503.6.

As shown in FIG. 5E, the system server may have domain attributes including Factory 504 including entity 504.1, Date Grouping Strategy 504.2, Formula 504.3, Field to Formula Input Mapping 504.4, Field to Formula Output Mapping 504.5, and Value Grouping Strategy 504.6.

As shown in FIG. 5F, the system server may have domain attributes including Formula 505 including Formula Inputs 505.1, Formula Outputs 505.2, and Formula Definition 505.3.

As shown in FIG. 5G, the system server may have domain attributes including Trigger 506 including Entity 506.1, Formula 506.2, and Field to Formula Mapping 506.3.

As shown in FIG. 5H, the system server may have domain attributes including Event 507 including Entity 507.1, Date & Time 507.2, Value 507.3, Labels 507.4, Location 507.5, and Custom 507.6.

As shown in FIG. 5I, the system server may have domain attributes including Warehouse 508 including Entity 508.1 and Date Grouping Strategy 508.2.

As shown in FIG. 5J, the system server may have domain attributes including Bundle 509 including Field 509.1, Date & Time 509.2, Value 509.3, Labels 509.4, Location 509.5, and Custom 509.6.

As shown in FIG. 5K, the system server may have domain attributes including Plugin 510 including Provider 510.1 and Formulas 510.2.

The logical modules may be coupled as depicted in FIG. 6. However, the logical modules are not limited to the coupling depicted in FIG. 6.

As shown in FIG. 5B, the system server has a User 501 defining a common actor that interacts with the system and has access to store, manipulate, and retrieve data contained within it. To access the system server, such a valid user may be used. A user may have a number of Entities 501.2 assigned to it. It can also contain a set of location coordinates in Location 501.3, as well as a number of arbitrary custom variables in Custom 501.4.

As shown in FIG. 5A, Entities 500 may be used to model an entity hierarchy, wherein a root entity is the top entity in the entity hierarchy. For example, Entities 500 can be used to model an organization hierarchy with divisions and departments (see FIG. 14), or a geographic hierarchy with countries, provinces and cities, to name a few. Systems and methods set no limit to how deep an entity hierarchy can go. To model the entity hierarchy, each Entity 500 may have a reference to a parent entity in Parent 500.1. If no parent entity exists, then the Entity 500 is considered the root entity of the entity hierarchy. An Entity 500 can also have a location attribute in Location 500.2 providing coordinates associated with its location, as well as a number of arbitrary custom attributes in Custom 500.3 assigned by Users 501 of the system server. Locations allow users to query the system for Entities 500 within a certain coordinate range (e.g. return all Entities 500 located with a radius of 10 degrees from coordinates 45,65), while custom attributes can be added in Custom 500.3 to categorize Entities 500 in one or more ways.

A shown in FIG. 5C, an Entity 500 can have a number of Fields 502, each of which is equivalent to a gauge. When defining a Field 502, Mode 502.3 and its UOM 502.2 may be set. Mode 502.3 may be "State" or "Event." UOM stands for "Unit Of Measure," which is a definite magnitude of a physical quantity, and which may be represented in UCUM notation. (For UCUM notation, see Gunther Schadow, Regenstrief Institute and Indiana University School of Informatics, Clement J. McDonald, National Library of Medicine, THE UNIFIED CODE FOR UNITS OF MEASURE, Lister Hill, Version 1.8.2.) Like with Entities 500, Fields 502 also support the custom attribute in Custom 502.5 as well as the location attribute in Location 502.4.

An Entity 500 can have a number of Fields 502 assigned to it. The process for defining new Fields 502 is depicted in FIG. 7 in view of FIG. 5C. Defining a Field 502 starts by assigning it an Entity 502.1 at step 701. At step 702, a UOM 502.2 is defined for the new Field 502. The new Field 502 is also associated with a Mode 502.3 at step 703. A mode can be marked as either a state at step 705 or an event at step 704.

Each Field 502 can generate a number of Values 503. (See FIG. 6.) Values 503 are the readings of a system gauge 406 or from an external system that can communicate with the system server 400 using the communication API 411. Besides this, Values 503 can also be generated by Factories 504 (e.g., via Grouping & Calculation Engine 611), in which case the Values 503 are products from a formula using other values as its input. As shown in FIG. 5D, Values 503 can also contain labels in Labels 503.4, custom attributes in Custom 503.6, as well as location attributes in Location 503.5.

Factories 504 are modules that may hold the configuration parameters for calculating new Values 503. As shown in FIG. 5E, Factories 504 include a Formula 504.3, a number of input fields from an Entity 504.1 in the entity hierarchy, output fields in Formula Output to Field Mapping 504.5, a Date Grouping Strategy 504.2, and a Value Grouping Strategy 504.6.

Factories 504 may be configured through process steps 801 to 806 as depicted in FIG. 8 and described herein below.

Turning back to FIG. 5F, Formulas 505 are pieces of logic that take a number of inputs for Formula Inputs 505.1 and generate a defined set of outputs for Formula Outputs 505.2. Formula Definitions 505.3 can be dynamic, in that they are defined by the user at run-time, or pre-defined. Dynamic formulas may be written in the Scala language and interpreted at run-time. Pre-defined formulas can be written in a language that generates JVM byte code and implements the system formula API.

Additional pre-defined formulas may be added to systems and methods through the use of formula plugins in Plugins 510. These plugins are resource packages containing machine-readable code that implement a plugin API.

Warehouses 508, like Factories 504, are modules that hold the configuration for generating Bundles 509, and can be defined at a level of the entity hierarchy by setting the desired entity attribute in Entity 508.1. A Date Grouping Strategy 508.2 may be set as well.

The steps in the process to define a Warehouse 508 are depicted in FIG. 9 through process steps 901 to 902, which include step 901: Define Entity and step 902: Define Date Grouping Strategy. Running a Warehouse 508 executes a process as defined through process steps 903 to 914, which include step 903: Retrieve All Fields Under All Entities; step 904: Apply Date And Value Grouping Strategy To Field Readings; step 905: Collect Earliest Unprocessed Readings For Fields; step 906: Retrieved Date?; step 907: For Each Field At Date Find Value; step 908: Value Exists?; step 909: Is State Field?; step 910: Set Input Value Of Field To Previous Field Value; step 911: Set Input Value Of Field To 0; step 912: Got All Fields For Date?; step 913: Generate Bundle For Date; and step 914: Store Bundle. This process collects all the Fields 502 and their associated Values 503 defined at the Entity 600 of the entity hierarchy downwards. Furthermore, the values it "bundles" from these entities can be filtered by selecting labels that were added to the entities and fields.

Turning back to FIG. 8 and process steps 807 to 820, Factories 504 can be utilized to generate new Values 503 based on pre-defined or custom formulas. Running a Factory 504 executes a process as defined through process steps 807 to 820. As shown in FIG. 8, process steps 807 to 820 include step 807: Retrieve Formula; step 808: Retrieve All Fields Under Entity Matched To Formula Inputs; step 809: Retrieve Values Of Matched Fields; step 810: Apply Date And Value Grouping Strategy To Field Readings; step 811: Collect Earliest Unprocessed Readings For Input Fields; step 812: Retrieved Date?; step 813: For Each Input Field At Date Find Value; step 814: Value Exists?; step 815: Is State Field?; step 816: Set Input Value Of Field To Previous Field Value; step 817: Set Input Value Of Field To 0; step 818: Got All Fields For Date?: step 819: Calculate Outputs From Collected Field Inputs At Date; and step 820: Store Output Values In Output Field.

Factories 504 can be utilized to generate new Values 503 based on pre-defined or custom formulas as described in reference to Factories 504 of FIG. 5E. When Factories 504 generate new Values 503 by applying a formula using inputs from different gauges, the readings from those gauges may have disparate time resolution and frequency.

In FIG. 10, for example, one gauge may generate readings every second (Gauge A), while another gauge may generate readings once a day (Gauge B) (e.g. once a day at 1:00 PM). Another gauge may generate readings once a month at an undefined time or once a day at random times (Gauge C), while yet another gauge may generate readings at completely random intervals at undefined times (Gauge D).

Before a calculation by a formula can take place, readings are normalized to a common resolution and frequency. For this purpose, systems and methods use a Grouping & Calculation Engine 611 as shown in FIG. 6.

For Factories 504 of FIG. 5E, the Grouping & Calculation Engine 611 (see FIG. 6) is used in process step 810 of FIG. 8. A formula may take readings from gauges such as Gauges A, B, C, and D of FIG. 10. To use the readings from these gauges, the readings may be adjusted to a common resolution. To achieve this, systems and methods can be instructed to use a particular date grouping strategy when applying a certain formula. A date grouping strategy consists of two parts: the resolution to use, and the time-zone. The resolutions to choose can be 'millisecond,' 'minute,' 'hour,' 'day,' 'week,' 'month,' 'year.' By default, systems and methods use the UTC time-zone for grouping dates, but a different time-zone can be selected as well. Assume for this case that the formula uses readings provided at a monthly resolution with UTC time-zone. The first step to normalize all the inputs would be to instruct systems and methods to group all the readings of all the gauges to a monthly resolution. The next step is to define, per gauge, the appropriate value grouping strategy to use when adjusting the resolution. Systems and methods support the following value grouping strategies: sum, average, minimum, maximum, first, and last.

Since the example formula uses monthly values, the value aggregation for Gauge A of FIG. 10 may be set to sum. Systems and methods then add up all the readings within a month and return a reading of 107 with a timestamp of 2012-01-31 23:59:59. For Gauge B the same strategy could be used, giving a reading of 158 with a timestamp of 2012-01-31 23:59:59. For Gauge C, presuming an averaging strategy, gives a reading of 294.88 with a timestamp of 2012-01-31 23:59:59. For Gauge D, presuming a state gauge, an averaging strategy may be elected. In this case, a reading of 11.91 is obtained with a timestamp of 2012-01-31 23:59:59.

By applying the logic described herein, each gauge may have a reading at 2012-01-31 23:59:59, which allows correct application of the formula in step 807 of FIG. 8. With this step completed, the factory process can now continue on to process step 811.

By applying a single date grouping strategy and a value grouping strategy per gauge, systems and methods are able to apply formulas of arbitrary complexity to a set of gauge readings. Systems and methods may be configured to calculate the carbon dioxide, methane, and/or nitrous oxide emissions from combustion of gaseous fuels using Formula I, which is an example formula corresponding to NGER Method 1 from Australia's NGER Technical Guidelines. (See Department of Climate Change and Energy Efficiency, "National Greenhouse and Energy Reporting System Measurement, Technical Guidelines for the estimation of greenhouse gas emissions by facilities in Australia," July 2012, p. 99.)

$$E_{ij} = \frac{Q_i \times EC_i \times EF_{ijoxec}}{1000} \quad \text{Formula I}$$

For Formula I, $E_{ij}$ is the emissions of gas type (j), being carbon dioxide, methane or nitrous oxide, from each gaseous fuel type (i) released from the operation of the facility during the year measured in $CO_2$-e metric tons; $Q_i$ is the quantity of fuel type (i) combusted (whether for stationary energy purposes or transport energy purposes) from the operation of the facility during the year measured in cubic meters or gigajoules; $EC_i$ is the energy content factor of fuel type (i) provided by NGER; and $EF_{ijoxec}$ is the emission factor for each gas type (j) released during the year (which includes the effect of an oxidation factor) measured in kilograms $CO_2$-e per gigajoule of fuel type (i), also provided by NGER.

First, an entity to represent the facility for which the emission of carbon dioxide, methane, and nitrous oxide from the combustion of a gaseous fuel source to be measured is defined.

Under this entity, one event gauge called $Q_i$ is defined through process steps 701 to 704 of FIG. 7 to capture at an interval the amount of fuel combusted by the facility. This gauge serves as input for variable $Q_i$.

Under the same entity, one event gauge called $E_{ij}$ is defined to hold the calculated emission values representing formula output $E_{ij}$.

To calculate the values for $E_{ij}$ a factory is configured through process steps 801 to 806 of FIG. 8. At step 801, a machine-readable code representation for Formula I is used. This formula holds the pre-defined NGER values for $EC_i$ and $EF_{ijoxec}$. At step 802, the defined entity representing the facility is used. At step 803, event gauge $Q_i$ is attached as input for variable $Q_i$. At step 804, date grouping strategy 'year' is applied. At step 805, value grouping strategy of 'sum' is applied for all readings of event gauge $Q_i$ during the course of the year. At step 806, state gauge $E_{11}$ is used to save the calculated values generated by Formula I.

The NGER formula for Method 1 is for illustrative purposes only and should not be construed as limiting the scope. For example, the system server according to embodiments described herein is equally applicable to more complex formulas for calculating emissions based on Methods 2, 3, and 4 of NGER. These methods use active sampling of the combustible source at regular intervals to calculate the appropriate emission factor. Take, for example, Formula II, which is an example formula corresponding to NGER Method 2 from Australia's NGER Technical Guidelines for the estimation of carbon dioxide emissions from combustion of gaseous fuels. (See Ibid., p. 102.)

$$E_{iCO_2} = \frac{Q_i \times EC_i \times EF_{iCO_2oxec}}{1000} - \gamma RCCS_{CO_2} \qquad \text{Formula II}$$

For Formula II, $\gamma$ is the factor $1.861 \times 10^{-3}$ for converting a quantity of carbon dioxide from cubic meters at standard conditions of pressure and temperature to $CO_2$-e metric tons; $RCCS_{CO_2}$ is carbon dioxide captured for permanent storage measured in cubic meters on a yearly basis; $E_{iCO_2}$ is emissions of carbon dioxide released from fuel type (i) combusted from the operation of the facility during the year measured in $CO_2$-e metric tons; $Q_i$ is the quantity of fuel type (i) combusted from the operation of the facility during the year measured in cubic meters or gigajoules; $EC_i$ is the energy content factor of fuel type (i) provided by sampling of the fuel source through the use of laboratory methods as provided by AS, NZ, ASTM, ISO and CEN standards organizations. The sampling frequency depends on the analysis method used, but for natural gas, for example, it is on a monthly basis for the gas composition, and continuous for the energy content of the gas; and $EF_{iCO_2oxec}$ is the carbon dioxide emission factor for fuel type (i) measured in kilograms $CO_2$-e per gigajoule, calculated by applying Formula III.

$$E_{i,CO_2ox,kg} = \sum_y \left[ \left( \frac{mol_y \; \% \times \left(\frac{mw_y}{V}\right) \times 100}{d_{y,total}} \right) \times \left( \frac{44.010 \times f_y \times OF_g}{mw_y \times 100} \right) \right] \qquad \text{Formula III}$$

For Formula III, $E_{i,CO_2ox,kg}$ is the carbon dioxide emission factor for fuel type (i), incorporating the effects of a default oxidation factor expressed as kilograms of carbon dioxide per kilogram of fuel; $mol_y$ % for each component gas type (y), is that gas type's share of 1 mole of fuel type (i), or that gas type's share of the total volume of fuel type (i), expressed as a percentage; $mw_y$ for each component gas type (y), is the molecular weight of the component gas type (y) measured in kilograms per kilomole; V is the volume of 1 kilomole of the gas at standard conditions and equal to 23.6444 cubic meters; and $d_{y,total}$ is calculated by applying Formula IV.

$$d_{y,total} = \sum_y mol_y \; \% \times \left(\frac{mw_y}{V}\right) \qquad \text{Formula IV}$$

For Formula IV, $mol_y$ % for each component gas type (y), is that gas type's share of 1 mole of fuel type (i), or that gas type's share of the total volume of fuel type (i), expressed as a percentage; $mw_y$ for each component gas type (y), is the molecular weight of the component gas type (y) measured in kilograms per kilomole. NGER provides a schedule for the molecular weights of typical component gases (e.g. methane, hydrogen, nitrogen, etc.).

Further for Formula III, $f_y$ for each component gas type (y), is the number of carbon atoms in a molecule of the component gas type (y). The number of carbon atoms in a component gas type is determined according to a schedule provided by NGER. Lastly, $OF_g$ is the oxidation factor 0.995 applicable to gaseous fuels.

Once $E_{i,CO_2ox,kg}$ has been determined, it can be converted to $EF_{iCO_2oxec}$ by applying Formula V where $EC_i$ is the same as the $EC_i$ in Formula II and $C_i$ is equivalent to $d_{y,total}$.

$$EF_{iCO_2oxec} = EF_{i,CO_2,ox,kg} \div \left(\frac{EC_i}{C_i}\right) \qquad \text{Formula V}$$

Implementation of this calculation method through the system server is possible. Six gauges may be defined using the process shown in FIG. 7.

Like the previous example, one event gauge $Q_i$ underneath the entity representing the facility captures readings of the quantity of gaseous fuels combusted throughout the year. Event gauge $Q_i$ may capture readings of the quantity of gaseous fuels combusted throughout the year, and this gauge represents formula input variable $Q_i$. FIG. 11 shows a sample dataset for readings of this gauge as table 1101.

A state gauge $EC_i$ may capture the energy content factor as determined through a monthly or continuous industry standard sampling method. This gauge represents the input variable $EC_i$, according to one embodiment.

A state gauge may measure $mol_y$ % for each component gas type of gaseous fuel source. In this example, the gaseous fuel source may hold four significant gas types: $CH_4$, $CO_2$, N, and $H_2O$. Thus, four $mol_y$ % gauges hold the percentage of each component gas type as sampled in the combustible source over regular intervals. These gauges represent the input variable $mol_y$ %. FIG. 11 shows an example dataset of readings for these gauges combined in table 1102.

State gauge $E_{iCO_2oxec}$ may hold the result generated from applying Formula III to gauges $mol_y$ % for each component gas, and convert it using the appropriate conversion Formula V. The values in this gauge may be generated by a factory holding formula having definitions for both Formula III and Formula V in machine-readable code. This gauge represents formula input variable $E_{i,CO_2ox,kg}$ for Formula II.

Event gauge $RCCC_{CO_2}$ may hold readings measuring the amount of carbon dioxide sequestered throughout the year. This gauge represents input variable $RCCS_{CO_2}$ for Formula II.

State gauge $E_{iCO_2}$ may hold the calculated value from Formula II.

Through the use of the plugin API, two formulas representing Formula II and Formula III may be uploaded in machine-readable code into the system logic 401. With these formulas loaded into the system server the factories can be defined to start calculating the values.

A first may be created called "Emission Factor Calculator." At step 801 of FIG. 8, the machine-readable code representing Formula III is referenced. At step 802, the same entity representing the facility combusting the gaseous fuel source is used. At step 803, each input gauge of $mol_y$ % for each component gas $CH_4$, $CO_2$, N, and $H_2O$ is mapped. The molecular weight values for $mw_y$ (Formula III) and $mw_y$ (Formula IV), the number of carbon atoms per gas type for $f_y$, as well as the oxidation factor of $OF_g$, are pre-defined by NGER and are part of the machine-readable representation of Formula III. Sample values generated by this factory are represented in table 1103 of FIG. 11. At step 804, a date grouping strategy of 'seconds' is applied for each sampling made for the gas. At step 805, a value grouping strategy of average is applied for all inputs. At step 806 state gauge $EF_{iCO_2oxec}$ is used to output the calculated values.

FIG. 11 shows the different values for each defined gauge used by factory described above. As can be seen in FIG. 11 and for illustrative purposes, gauges $EC_i$, $CH_4$, $CO_2$, N, and $H_2O$ are sampled once a month on the first day of every month at 1:00 PM.

When the "Emission Factor Calculator" factory runs, it processes steps 807 to 820 as shown in FIG. 8. These process steps take the readings from these gauges, apply the necessary formula with the appropriate date grouping strategy and value grouping strategy, and place the result in gauge $EF_{iCO_2oxec}$. Example readings are depicted in FIG. 11.

In FIG. 11 that the readings of gauge 1101 (Gauge $Q_i$) occur more or less randomly with either one or two occurrences each month. Now with values in state gauge 1103 (Gauge $EF_{iCO_2oxec}$) the emissions generated at each reading in gauge 1101 can be calculated.

To calculate the emissions generated, another factory called "Emission Calculator" is created with the following configuration: At step 801 of FIG. 8, a machine-readable representation of Formula II is defined; at step 802, event gauge $Q_i$ and state gauges $EC_i$ and $E_{iCO_2oxec}$ are mapped as inputs to $Q_i$ (Formula II), $EC_i$ (Formula II), and $E_{iCO_2oxec}$ (Formula V), respectively; at step 804, a date grouping strategy of 'seconds' is defined; at step 805 define a value grouping strategy of 'sum' for the event gauges and 'average' for the state gauges; and, at step 806, event gauge $E_{iCO_2}$ is defined to hold the calculated values from this factory. Table 1201 in FIG. 12 provides a graphical representation of the inputs and outputs generated by this factory.

A Warehouse 508 is similar to a Factory 504 in that it applies a date grouping strategy to "bundle" multiple readings from different gauges, but instead of generating new readings, it bundles them together into a format ideal for further aggregating and reporting.

Adverting to the previous example using Formula II with gauges as described in FIG. 11, if a report was created with all the readings from every gauge side by side, there would be some gauges with no readings on certain dates and times. Table 1201 in FIG. 12 has no readings for gauge $Q_i$ for 2012-01-01 13:00:00, but gauges $EC_i$ and $E_{iCO_2oxec}$ do have readings. Similarly, $EC_i$ and $EF_{iCO_2oxec}$ have no readings at 2012-01-02 09:50:22, but $Q_i$ does. To include this data in a report, it is useful if the readings are aggregated first to daily values. In other words, a date grouping strategy of 'day' to all the relevant gauge readings may be applied first. This allows for viewing the same data as represented in table 1301 in FIG. 13.

FIG. 13 shows the gauge readings from some gas sampling gauges and calculated values from Formulas II and III in a "Warehouse Bundle" format. The Warehouse Bundle format is a format to store different aggregation methods applied to the same gauge reading at a specified resolution.

As can be seen from table 1301, a warehouse bundle differs from a regular reading in that it contains values aggregated to a certain date, holding all the different value aggregation strategies within it. By doing so, reports can easily be generated using one of the six value aggregation strategies provided for a gauge. In table 1302 of FIG. 13, the same data is shown, but the data is filtered for sum values for all gauge readings.

Generating a report with the example given works well when dealing with one entity, for example, one furnace facility that burns a certain amount of combustible fuel measured with event gauge $Q_i$ at various days in a month. Usually, however, organizations have multiple entities with gauges generating readings at various frequencies and resolutions. To accommodate the natural (or ephemeral) hierarchy of economic activities, the system server allows for Entities 500 as shown in FIG. 5A to be arranged in an entity hierarchy of arbitrary depth. By adding Fields 502, also known as gauges, to each desired entity, there is a natural "roll-up" strategy for aggregating gauge readings up the entity hierarchy. FIG. 14 provides a graphical representation of gauges in an entity hierarchy.

As shown in FIG. 14, a system server allows gauges to be organized in an arbitrary hierarchy allowing for the aggregation of gauge readings within such a hierarchy. The figure shows an organization called "Acme Inc.," which has a division called "Metal Works." This division has three furnaces: Furnace A, Furnace B, and Furnace C. Each of these furnaces consumes the combustible fuel source at different days, times, and quantities. The amount of fuel consumed is captured, for each furnace, via an event gauge $Q_i$. As the Metal Works division samples the fuel all furnaces consume at division level, the "Metal Works" entity has the gas sampling gauges $EC_i$ and $EF_{iCO_2oxec}$ defined.

Although reports for each furnace may be separately created, as an organization it is also interesting to generate a single report at division level showing the total fuel consumed by all furnaces in the Metal Works division.

Systems and methods include an aggregation framework allowing bundles to be aggregated up the entity tree. For the example in FIG. 14, systems and methods may be configured to have a root entity called "Acme Inc." This root entity would have a single child entity called "Metal Works." The "Metal Works" entity in turn would have three child entities called "Furnace A," "Furnace B," and "Furnace C," respectively. Each of these furnace child entities would each have a state gauge $Q_i$ defined to store fuel consumption readings. To generate a report of all fuel consumption at the Metal Works division level, systems would be instructed at runtime to aggregate all bundles up to the "Metal Works" entity level. This then automatically includes bundled readings from all gauges within the entity hierarchy as depicted in table 1501 of FIG. 15.

Systems and methods also provide Trigger 506 and Event 507 domains as shown in FIGS. 5G and 5H. These domains provide an awareness capability providing users a mechanism to obtain alerts when user-defined conditions are met.

Triggers 506 are configured on Fields 502 who feed new Values 503 received for those fields into a Formula 505 configured for that trigger. A Trigger 506 is configured through process steps 1601 to 1603 depicted in FIG. 16. At step 1601, Formula 505 shown in FIG. 5F can generate one, many, or no outputs. If the formula generates an output, an Event 507 is created. If a formula generates no output, no Event 507 is created. At step 1602 of FIG. 16, the entity is created under which the Trigger 506 is configured. At step 1603, based on the entity configured at step 1602, the formula inputs are mapped to the fields of the entity.

When a trigger is activated, it runs continuously checking if all the inputs for its configured formula have been received. It does so by maintaining an internal cache of all the latest values received for the fields that are mapped to the formula. If all the fields receive a new value carrying the same date and time, then those values are fed into the formula. If the formula provides outputs, events are created and stored in the system server. If no outputs are generated, no events are created or stored.

The process of a running trigger is depicted through process steps 1604 to 1610, which include step 1604: Retrieve Formula; step 1605: Retrieve All Fields Under Entity Matched To Formula Inputs; step 1606: Wait For Field Values For All Formula Inputs; step 1607: All Fields Have Values?; step 1608: Calculate Outputs From Collected Field Inputs At Date; step 1609: Generate Event; and step 1610: Store Event.

The flowcharts of FIG. 7, FIG. 8, FIG. 9, and FIG. 16 show the functionality and operation of an implementation of portions of the system logic 401 and the communication API 411. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as the system server processor 404 and the system gauge sensor processor 408 in a computer system or another system. The machine code can be converted from the source code, etc. If embodied in hardware, each block can represent a circuit or a number of interconnected circuits to implement the specified logical function(s).

Although the flowcharts of FIG. 7, FIG. 8, FIG. 9, and FIG. 16 show a specific order of execution, it should be understood that the order of execution can differ from that which is depicted. For example, the order of execution of two or more blocks can be scrambled relative to the order shown. Also, two or more blocks shown in succession in FIG. 7, FIG. 8, FIG. 9, and FIG. 16 can be executed concurrently or with partial concurrence. In addition, a number of counters, state variables, warning semaphores, or messages might be added to the logical flow provided herein, for purposes of enhanced utility, accounting, performance measurement, or providing troubleshooting aids, etc. It should be understood that all such variations are within the scope of the present disclosure.

Also, the logic or application provided herein, including the system logic 401 and the communication API 411, that comprises software or code can be embodied in a computer-readable storage medium for use by or in connection with an instruction-execution system such as, for example, the system server processor 404 and the system gauge sensor processor 408 in a computer system or another system. In this sense, the logic can comprise, for example, statements including instructions and declarations that can be fetched from the computer-readable storage medium and executed by the instruction execution system.

A "computer-readable storage medium" includes a medium that can contain, store, or maintain the logic or application provided herein for use by or in connection with the instruction-execution system. The computer-readable storage medium can comprise one or more physical media such as, for example, electronic, magnetic, optical, electromagnetic, infrared, or semiconductor media. More specific examples of a suitable computer-readable storage medium would include, but are not limited to, magnetic tapes, magnetic floppy diskettes, magnetic hard drives, memory cards, solid-state drives, USB flash drives, or optical discs. Also, the computer-readable storage medium can be a random access memory (RAM) including, for example, static random access memory (SRAM) and dynamic random access memory (DRAM), or magnetic random access memory (MRAM). In addition, the computer-readable storage medium can be a read-only memory (ROM), a programmable read-only memory (PROM), an erasable programmable read-only memory (EPROM), an electrically erasable programmable read-only memory (EEPROM), or other type of memory device.

As such, provided herein is a method for a server system comprising collecting sensor readings obtained from disparate sensor types using a gauge for the server system or a device implementing the a communication API for the server system; storing said sensor readings in the server system using domain attributes of the server system; organizing said sensor readings in a hierarchy of arbitrary depth; returning new values using formulas of arbitrary complexity using said sensor readings as inputs for the formula; setting triggers to provide an alerting mechanism on sensor reading changes based on formulas of arbitrary complexity; returning sensor data and newly calculated values in a uniform queryable format for data analysis and reporting purposes. In some embodiments, the method further comprises the step aggregating sensor readings to a common time resolution. In some embodiments, said sensor readings collected are entered through the use of a gauge for the server system or similar device that implements the communication API for the server system. In some embodiments, said sensor data is converted into a format allowing for the aggregation of said sensor data along a hierarchy. In some embodiments, formulas of arbitrary complexity can be added and used to generate new values or provide an alerting mechanism through triggers on sensor readings. In some embodiments, the data is converted into a format incorporating the aggregated values along an aggregation hierarchy as well as smoothing the data based on sensor readings measuring state changes or events. In some embodiments, the alerting mechanism generates alert events based on sensor readings changes. In some embodiments, the alert mechanism generates alerts based on the products generated by a formula of arbitrary complexity with sensor readings changes.

Also provided herein is a computer-readable storage medium having a computer-readable program code embodied therein, wherein the computer-readable program code is adapted to be executed to implement a method for a server system comprising collecting sensor readings obtained from disparate sensor types using a gauge for the server system or a device implementing the a communication API for the server system; storing said sensor readings in the server system using domain attributes of the server system; organizing said sensor readings in a hierarchy of arbitrary depth; returning new values using formulas of arbitrary complexity using said sensor readings as inputs for the formula; setting triggers to provide an alerting mechanism on sensor reading changes based on formulas of arbitrary complexity; returning sensor data and newly calculated values in a uniform queryable format for data analysis and reporting purposes.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Various changes in the details of the illustrated operational methods are possible without departing from the scope of the following claims. Some embodiments may combine the activities provided herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments may be apparent to those of skill in the art upon reviewing the above description. The scope should, therefore, be determined with reference to the appended claims, along with the full scope of equivalents to which such claims are entitled.

What is claimed is:

1. A computer-implemented method comprising executing on a device the steps of:
   collecting gauge readings from a plurality of gauges;
   storing the gauge readings in a database of a server comprising a processor and addressable memory;
   normalizing select gauge readings in near-real time at the server from the database of the server in response to a user query;
   generating a relationship among the select gauge readings in response to the user query, wherein each gauge reading comprises a time stamp, a field name, and a field value, and wherein the gauge readings are normalized to a common resolution based on the time stamp and a value grouping based on the field value;
   generating information, using an alerting mechanism, for configuring an entity that provides feedback in a domain agnostic system, based on said relationship among the select gauge readings; and
   generating an alert in response to the select gauge readings satisfying a certain condition.

2. The method of claim 1, wherein the value grouping is based on at least one of: sum, average minimum, maximum, first, and last field values.

3. The method of claim 2, wherein the relationship measures changing radiation levels.

4. The method of claim 2, wherein the relationship measures at least one of: changing temperature levels and changing luminosity levels.

5. The method of claim 1, wherein the condition is a user-defined condition.

6. A computer-implemented method comprising executing on a device the steps of:
   storing gauge readings from a plurality of gauges in a database of a server comprising a processor and addressable memory;
   normalizing select gauge readings in near-real time at the server from the database of the server in response to a user query;
   generating a relationship among the select gauge readings in response to the user query, wherein each gauge reading comprises a time stamp, a field name, and a field value, and wherein the gauge readings are normalized to a common resolution based on the time stamp and a value grouping based on the field value;
   generating information, using an alerting mechanism, for configuring an entity that provides feedback in a domain agnostic system, based on said relationship among the select gauge readings; and
   generating an alert in response to the select gauge readings satisfying a certain condition.

7. The method of claim 6, wherein the value grouping is based on at least one of: sum, average minimum, maximum, first, and last field values.

8. The method of claim 7, wherein the relationship measures changing radiation levels.

9. The method of claim 7, wherein the relationship measures at least one of: changing temperature levels and changing luminosity levels.

10. The method of claim 6 further comprising:
    generating an alert in response to the select gauge readings satisfying a user-defined condition.

11. A non-transitory computer-readable storage medium having stored therein, computer executable instructions that, if executed by a device, cause the device to perform a method comprising:
    storing gauge readings from a plurality of gauges in a database of a server comprising a processor and addressable memory associated with the device;
    normalizing select gauge readings in near-real time at the server from the database of the server in response to a user query;
    generating a relationship among the select gauge readings in response to the user query, wherein each gauge reading comprises a time stamp, a field name, and a field value, and wherein the gauge readings are normalized to a common resolution based on the time stamp and a value grouping based on the field value;
    generating information, using an alerting mechanism, for configuring an entity that provides feedback in a domain agnostic system, based on said relationship among the select gauge readings; and
    generating an alert in response to the select gauge readings satisfying a certain condition.

12. The computer-readable storage medium of claim 11, wherein the value grouping is based on at least one of: sum, average minimum, maximum, first, and last field values.

13. The computer-readable storage medium of claim 12, wherein the relationship measures at least one of: changing radiation levels, changing temperature levels, and changing luminosity levels.

* * * * *